(12) United States Patent
Kuzmin

(10) Patent No.: US 9,268,485 B2
(45) Date of Patent: Feb. 23, 2016

(54) LATTICE KEYBOARDS WITH RELATED DEVICES

(71) Applicant: MICROTH, INC., Staten Island, NY (US)

(72) Inventor: Yevgeniy Kuzmin, Celebration, FL (US)

(73) Assignee: MICROTH, INC. NY (US)

( * ) Notice: Subject to any disclaimer, the term of this patent is extended or adjusted under 35 U.S.C. 154(b) by 28 days.

(21) Appl. No.: 14/261,999

(22) Filed: Apr. 25, 2014

(65) Prior Publication Data

US 2014/0320411 A1    Oct. 30, 2014

Related U.S. Application Data

(60) Provisional application No. 61/817,543, filed on Apr. 30, 2013.

(51) Int. Cl.
*G06F 3/0488* (2013.01)
*G06F 3/02* (2006.01)

(52) U.S. Cl.
CPC .......... *G06F 3/04886* (2013.01); *G06F 3/0202* (2013.01); *G06F 3/0219* (2013.01)

(58) Field of Classification Search
None
See application file for complete search history.

(56) References Cited

U.S. PATENT DOCUMENTS

| | | | |
|---|---|---|---|
| 6,919,879 B2 | 7/2005 | Griffin et al. | |
| 7,042,442 B1 | 5/2006 | Kanevsky et al. | |
| 7,126,498 B2 | 10/2006 | Levy | |
| 7,359,106 B1 * | 4/2008 | Amm | G02B 26/0808 359/290 |
| 7,372,454 B2 | 5/2008 | Betts-LaCroix | |
| 7,423,634 B2 * | 9/2008 | Amiri | 345/168 |
| 7,658,562 B2 | 2/2010 | Suess | |
| 8,258,986 B2 | 9/2012 | Makovetskyy | |
| 8,291,567 B1 * | 10/2012 | Keenan | B65D 71/70 206/703 |
| 8,319,669 B2 | 11/2012 | Weller | |
| 8,459,885 B2 | 6/2013 | Min | |
| 8,487,897 B1 | 7/2013 | Hsieh | |
| 2004/0046742 A1 * | 3/2004 | Johnson | 345/168 |
| 2005/0253816 A1 | 11/2005 | Himberg et al. | |
| 2006/0096372 A1 * | 5/2006 | Sugihara | G06F 17/509 73/432.1 |
| 2007/0188472 A1 | 8/2007 | Ghassabian | |
| 2009/0079702 A1 * | 3/2009 | Colley | 345/173 |

(Continued)

OTHER PUBLICATIONS

Peikert et al., "Packing Circles in a Square: A Review and New Results," Nov. 20, 2004, 10 pages.

(Continued)

*Primary Examiner* — Kent Chang
*Assistant Examiner* — Nathan Brittingham
(74) *Attorney, Agent, or Firm* — Allen Dyer Doppelt et al.

(57) ABSTRACT

An electronic device may include a processor, a memory coupled to the processor, and a touch-enabled display coupled to the processor. The processor may be for generating a lattice of nodes of a circular packing being based upon a connected transformation of a square circular packing. The connected transformation may preserve adjacency between pairs of adjacent circles of the square circular packing after a transformation. The processor may also be for displaying a lattice keyboard on the touch-enabled display. The lattice keyboard may include keys, each of the key being associated with an input value and being selectable based on user touches provided to the touch enabled display. The keys may be arranged in a lattice pattern such that the center of each key is placed in the position of a respective node of the lattice.

27 Claims, 18 Drawing Sheets

(56) References Cited

U.S. PATENT DOCUMENTS

| | | | |
|---|---|---|---|
| 2009/0100333 A1* | 4/2009 | Xiao | G06T 11/60 |
| | | | 715/252 |
| 2009/0189864 A1 | 7/2009 | Walker et al. | |
| 2010/0161538 A1 | 6/2010 | Kennedy, Jr. et al. | |
| 2011/0299768 A1* | 12/2011 | Singh | H04N 9/045 |
| | | | 382/162 |
| 2012/0240069 A1 | 9/2012 | Kawalkar | |
| 2012/0262311 A1 | 10/2012 | Weller | |
| 2013/0167064 A1 | 6/2013 | Amsterdam et al. | |

OTHER PUBLICATIONS

Henze et al., "Observational and Experimental Investigation of Typing Behaviour Using Virtual Keyboards on Mobile Devices," CHI'12, May 5-10, 2012, Austin, Texas, 10 pages.

Packomania, www.packomania.com, Apr. 3, 2014, 1 page.

* cited by examiner a) A = 30° b) A = 60° a) A = 30° b) A = 60°

FIG. 16

LATTICE KEYBOARDS WITH RELATED DEVICES

RELATED APPLICATIONS

This application is based upon prior filed co-pending application Ser. No. 61/817,543 filed Apr. 30, 2013, the entire subject matter of which is incorporated herein by reference in its entirety.

TECHNICAL FIELD

The present disclosure relates to methods and devices for input and control for electronic devices and, more particularly, to lattice keyboards.

BACKGROUND

With the development of computers and electronic devices, data input and control have become one of the fundamental problems of computer-human interaction. Typical data input systems are usually based on language writing systems with elementary input actions corresponding to symbols of language script system. The most common implementation of such script-based input system is the keyboard with input keys representing symbols of scripts. Legacy computer keyboard were designed for two-hands input, and are modifications of typewriter keyboards.

Miniaturization of electronic devices in general and development of mobile devices, especially, caused a lot of issues with input and control of such devices. Limited screen and surface area of mobile and wearable devices doesn't provide enough space for a convenient hardware or virtual keyboard, but miniature keyboards may be difficult to use.

Many mobile devices are designed for one hand operation in portrait mode and are tall and narrow, further limiting the space for a keyboard in the portrait mode and reducing the size of keys. Operating the device with such miniature keys leads to many input errors and ambiguity of input. Persons with vision and motion disabilities often can't use such devices due these issues. Another problem of virtual keyboards is that they have very different key sizes and distances between keys for portrait and landscape modes.

Different approaches have been proposed for the aforementioned problems. Most approaches don't modify the arrangement of keys, but use different methods of prediction, disambiguation and correction of input to reduce the number of input errors and ambiguity. That doesn't eliminate the source of the problems, but just treats its consequences.

Another approach is based on assignment of several input meanings to several larger keys and disambiguating of input by directional flicks, multi-tap or word disambiguation. These approaches are very often used for hardware phone keypads. The Fastap keyboard (U.S. Pat. No. 7,126,498 to Levy) uses a square matrix of small contact keys. Different combinations of simultaneously pressed keys represent different input meanings. Such non-traditional layouts and input methods are difficult to learn and use. User research shows that 83% of users prefer entering text on a familiar QWERTY layout.

The Delta II keyboard described in U.S. Pat. No. 7,658,562 to Suess provides another approach to the problem. It uses a rectangular matrix arrangement with 6 rows of 5 keys to represent all 26 alphabetic keys of QWERTY keyboard. This arrangement provides an increase of key size, comparing to the legacy QWERTY keyboard of the same width, but unfortunately as it described later, such square key arrangements have the smallest key sizes among other possible key arrangements. Also due the fixed nature of the arrangement, the width of a keyboard strictly determines the size of keys and it cannot be changed and adjusted to user needs and different screen sizes without deformation of key shapes.

A keyboard with keys of variable shapes and areas to represent more frequent letters with bigger keys is described in U.S. Pat. No. 7,372,454 to Betts-LaCroix. The approach is based on the area of keys, but as it was found that the distance between key centers, but not their area, is the determining factor for efficient input. Another issue for this keyboard is that shapes of keys are different and non-convex.

As disclosed in "Observational and Experimental Investigation of Typing Behaviour using Virtual Keyboards on Mobile Devices" by Niels Henze, Enrico Rukzio, and Susanne Boll, keyboards users tend to select some "target" point of a key shape in the process of key pointing. These target points are close to geometric center of a key's shape. Positions of key touches are normally distributed around these target points. In typical implementations of virtual keyboards, the key with the target point closest to a touch position is selected as the input key.

Target points of keys determine a subdivision of a plane into cells of a Voronoi diagram. Each cell comprises a polygon with inner points are closest to target point within a cell. Therefore, touch positions within a cell of Voronoi diagram are recognized as inputs for a key corresponding to this cell. To improve touch recognition and to increase areas of cells, the minimal distance from target points to the border of their Voronoi cell should be maximized. This is equivalent to maximization of distances between target points of keys itself. That leads to the spreading point optimization problem: to find positions of given number of points within a container of a given shape, which maximizes a minimal distance between points. Keys with centers in these positions will provide the optimal key arrangements with the maximum spreading of keys.

There is a known geometry problem of point spreading within a square. As disclosed in "Packing Circles in a Square: A Review and New Results", Peikert et al., this problem is equivalent to the dual problem of optimal packing of unit circles within a square shape, i.e. to find a smallest square, containing given number of unit circles. Both, these problems are not yet solved in the general case, but there are approaches for many particular cases for given numbers of circles. Similar problems of optimal unit circle packing within different shapes are described and demonstrated by packomania. The best-known approaches for different numbers of unit circles within rectangles of variable shapes are also provided there.

A variety of iterative numeric optimization methods are developed to solve point spreading and circle packing problems in the general case. Many of these arrangements of keys are unstructured, non-periodic and keys may be adjacent to different number of other keys. They may be loose and have keys, which are not adjacent to any other keys. Therefore, these arrangements are no well suited for use as keyboard arrangements.

Many user interfaces are based on selection of an object from a grid of objects, for example, application icons at home screens of different operational systems, options in application menus. Usually, such interfaces are fixed and are not adjustable to windows of different sizes. Resizing of windows may lead to a rearrangement and hiding of some elements of grid interfaces.

SUMMARY

In view of the foregoing background, embodiments of the present invention provide transformable lattice keyboards adjustable to variable sizes of screens and devices while preserving an initial layout of inputs and having the optimal key spreading.

An electronic device may include a processor, a memory coupled to the processor, and a touch-enabled display coupled to the processor. The processor may be for generating a lattice of nodes of a circular packing being based upon a connected transformation of a square circular packing. The connected transformation may preserve adjacency between pairs of adjacent circles of the square circular packing after a transformation. The processor may be for displaying a lattice keyboard on the touch-enabled display, the lattice keyboard comprising a plurality of keys. Each of the keys may be associated with at least one input value and may be selectable based on user touches provided to the touch enabled display. The plurality of keys may be arranged in a lattice pattern such that the center of each key is placed in the position of a respective node of the lattice.

In particular, the circular packing of the lattice keyboard may comprise a circular packing of circles of a same diameter within a container. The shape of the container may be a rectangle.

In some embodiments, a length on a first side of the rectangle of the container may be a given constant value, a distance between centers of adjacent circles of the circular packing of the lattice keyboard may be a given constant value, and a length of a second side of the rectangle of the container may be variable and may have a minimal possible value. In other embodiments, a length on a first side of the rectangle of the container may be a given constant value, a length on a second side of the rectangle of the container may be a given constant value, and a distance between centers of adjacent circles of the circular packing of the lattice keyboard may be variable and may have a maximal possible value.

The rectangle of the container of lattice keyboard may have an adjustable size and an adjustable position on the touch-sensitive display. Positions and displacements of first and second input pointers on the touch-sensitive display may be used for determination of the adjustable position and the adjustable size of the rectangle of the lattice keyboard on the touch-sensitive display.

Also, the circular packing of the lattice keyboard may be a staggered periodic packing. The keys in rows of the lattice keyboard may preserve an order of input values of keys in and between rows of a square lattice keyboard. The lattice keyboard may preserve an order of keys in and between rows of a QWERTY keyboard.

In some embodiments, the plurality of keys of the lattice keyboard may have identical shapes within bounding circles. The shapes of the plurality of keys of the lattice keyboard may not be displayed.

Another aspect is directed to a keyboard. The keyboard may comprise a plurality of keys, each of the keys being associated with at least one input value. The plurality of keys may be arranged in a lattice pattern such that a center of each key is placed in a position of a respective node of the lattice. The lattice of nodes of a circular packing may be based upon a connected transformation of a square circular packing, the connected transformation preserving adjacency between pairs of adjacent circles of the square circular packing after a transformation. In some embodiments, the keyboard further comprises solid dot knobs in centers of keys of a lattice keyboard over flat touch sensitive surface.

Another aspect is directed to a lattice input interface. The lattice input interface may comprise a plurality of keys, each of the keys being associated with at least one input value. The plurality of keys may be arranged in a lattice pattern such that a center of each key is placed in a position of a respective node of the lattice. The lattice of nodes of a circular packing may be based upon a connected transformation of a square circular packing, the connected transformation preserving adjacency between pairs of adjacent circles of the square circular packing after a transformation.

In some embodiments, the lattice of keys is manifested electronically upon a touch enabled screen. In other embodiments, the lattice of keys may be disposed upon a plurality of buttons.

BRIEF DESCRIPTION OF THE DRAWINGS

FIG. 16 is a schematic diagrams of embodiments of QWERTY staggered lattice pinboards, according to the present invention.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Connected Transformations of the Square Circular Packing

Keyboards of the present disclosure are based on a solution for the problem of optimal point spreading within a container. To simplify the process of searching the optimal solution, the method of disclosure may consider only point spreading with the following property: minimal distances from any point to the closest point are equal. This is a very natural condition for keyboards, which provides the uniform key spreading for all keys. Since all minimal distances are the same, then the maximum of minimal distances is also equal to the same value. Further, this distance D will be called a spreading distance.

The method of the disclosure may consider a plurality of circles with diameters equal to the spreading distance D and centers in points of such point spreadings. Since all minimal distances are equal, then these circle pluralities are connected circle packings with non-overlapping circles, and each circle is adjacent to at least one other circle. Therefore, key arrangements of the disclosure also may be represented by connected packings of equal circles. Both representations of a key arrangement, as a point spreading or as a circle packing, are equivalent, and the method may use any of them to construct an optimal keyboard. Keys of a keyboard of the disclosure are placed into positions of points of a spreading or centers of circles of a packing.

Circles from a connected circle packing may have a different number of adjacent circles. The method of the invention introduces another requirement providing a preservation of the structure. The fundamental property of circle packings of the present disclosure is that they are results of connected transformations of the basic square circle packing.

Figure 1:
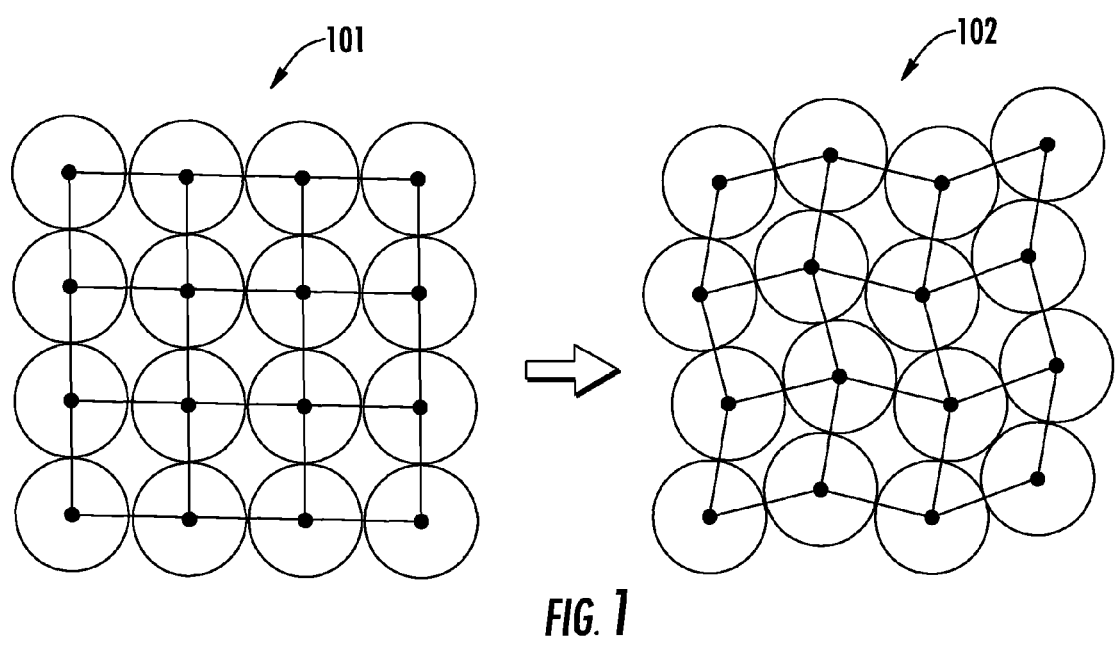
FIG. 1 is a drawing illustrating a connected transformation of a square lattice, according to the present invention.

Connected transformations of the invention preserve the adjacency of circles in a packing: if a pair of circles were adjacent in the basic square packing, then they remain adjacent in a transformed packing. Therefore, connected transformations of the disclosure preserve a 4-connected structure of lattice of the original square packing, and circles of the transformed packing may be indexed by indexes of rows and columns of the original square packing. The example of connected transformation of the square packing 101 into 4-connected lattice 102 is demonstrated at FIG. 1. Hereinafter, circle packings of the invention preserving 4-connectivity of the square circle packing are called lattices, and keyboards with keys in the centers of circles of a lattice are called lattice keyboards.

Transformable 4-connected lattices of the present disclosure provide a flexible and powerful tool for generation of lattice keyboards preserving a structure of original square keyboards. The key arrangement of the invention may be demonstrated by a transformable mechanical 4-connected lattice with circular nodes of unit diameters and rigid unit edges connecting centers of adjacent nodes. Edges may rotate around centers of nodes. Such a mechanical lattice preserves adjacency of nodes during transformations.

The method of the invention transforms the square lattice within some container into a target lattice within another target container. During a transformation, the diameter of circles may vary to fit a target container, or the shape of a container may vary to accommodate the diameter of circles. The objective of the method is to construct an optimal target lattice within a target container.

Rectangular Containers

The method of the invention is not limited to any specific containers and can be applied to containers of arbitrary and variable structure and shape. In some embodiments of the method of the disclosure, lattice containers have a rectangular shape. This is reasoned by the fact, that most of existing software and hardware keyboards have a rectangular shape. This shape perfectly fits to the rectangular shape of screens and screen windows. Therefore, in one embodiment, the method of the disclosure performs a connected transformation of a square lattice within an original rectangle into a lattice within another target rectangle.

Many different objectives of the method may be considered depending on structure and properties of target rectangular containers. In one embodiment, the objective of the present disclosure may be: for a rectangular container of given fixed width and a given number of unit circular keys find a circular lattice packing with the minimal area of the rectangle. Another packing problem and objective of the disclosure may be: for a rectangular container of given ratio of sides and a given number of unit circular keys, find a lattice packing with the minimal area of the rectangle.

Connected transformations in the general case may produce a variety of possible lattices. To simplify the problem and to find the optimal solution, the method of the present disclosure may introduce some additional requirements and constraints influenced by a problem. One of these requirements of the disclosed method may be that the lattice of circle centers is periodic. This is the very natural requirement for keyboard arrangements, because all existing traditional keyboards have near periodic structure of key placement.

The requirement of periodicity of the key lattice is also reasonable, because it's proven that the periodic hexagonal unit circle packing is the densest of the unrestricted planar packings. The density of this packing is the upper bound for densities of any restricted container packings. The densest known packings within rectangles for given number of unit circles are periodic or near periodic too. In 3D, the densest known packing of unit spheres is also periodic. This result known as the Kepler's conjecture, but it isn't proven yet.

True Periodic Lattices

This disclosure now considers, at first, properties of different planar periodic circular lattices. The basic embodiment of the planar periodic lattices of the present disclosure is true periodic packings. All planar true periodic packings of unit circles may be determined by mutual interposition of just three adjacent unit circles. Indeed, three adjacent unit circles determine two different basic vectors between centers of circles. These two basic vectors determine the true periodic lattice of centers for all other circles of the true periodic packing. This feature radically reduces the dimension of the space of possible solutions for the optimal packing problem to just 1 and makes it easily solvable. All circles of true periodic packing are adjacent to at least 4 other circles, and therefore any true periodic packing is a result of connected transformation of the square lattice and is a lattice of the present disclosure.

Actually, just the angle between these two basic vectors determines all true planar periodic lattices of unit circles up to a rotation of the plane. This angle may change from 60 to 90 degrees. The density of true periodic packings is changing linearly from the maximum value equal to sqrt(3)*pi/6~0.9069 at 60 degrees to the minimal value equal to pi/4~0.785490 at 90 degrees. The true periodic packing corresponding to 60 degrees is called a hexagonal lattice, and the true periodic packing corresponding to 90 degrees is called a square lattice. A hexagonal lattice is the only lattice of the disclosure with 6-connectivity of circles.

Staggered Periodic Lattices

Figure 2:
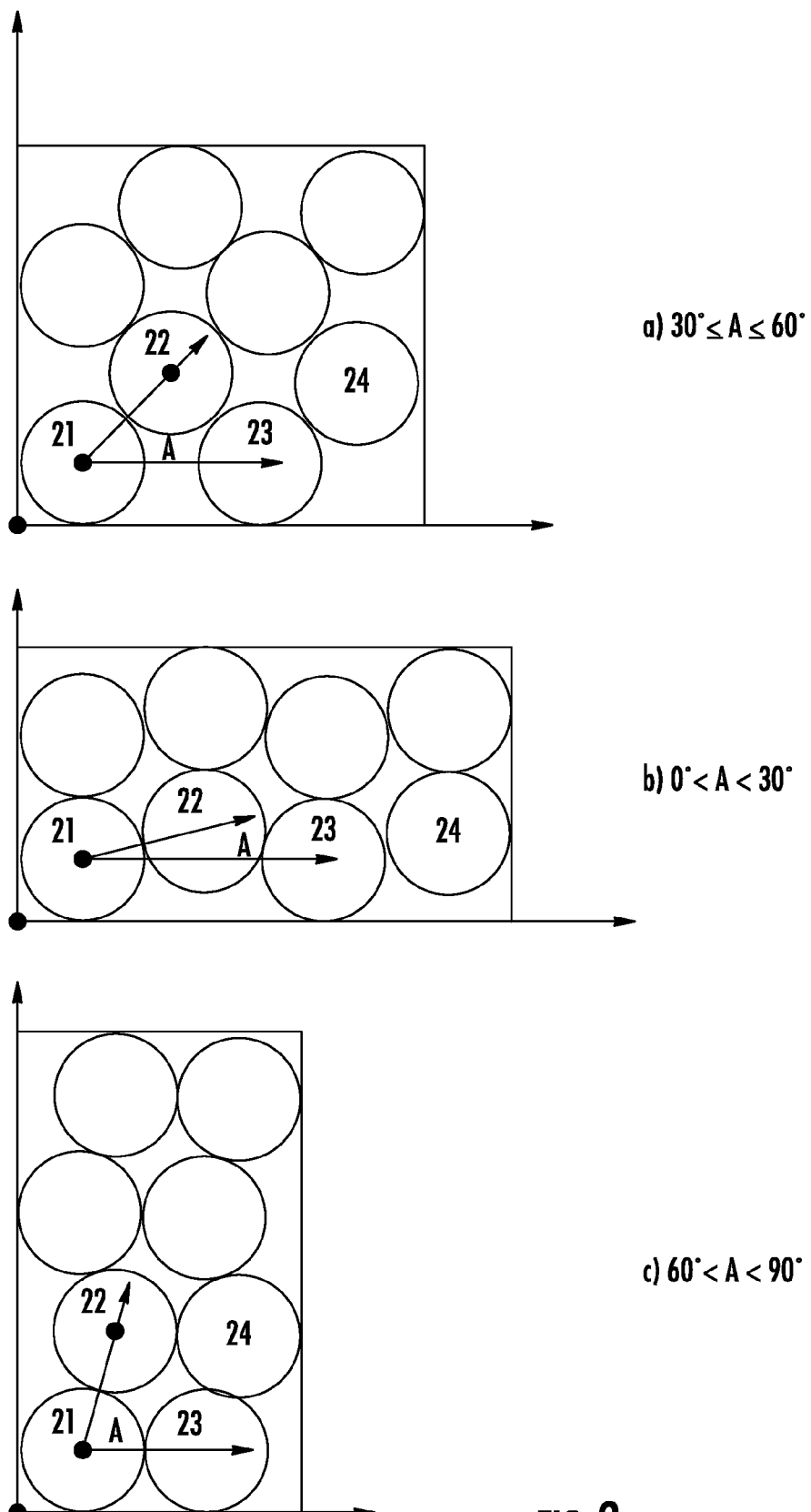
FIG. 2 is a schematic diagram illustrating different cases of staggered periodic circular packings depending on stagger angle, according to the present invention.

True periodic lattices are an embodiment of lattices of the disclosure, but they do not cover some important cases of possible circle interpositions. In some embodiments of the current disclosure, the method considers an extension of true periodic packings—staggered periodic planar packings P(A). FIG. 2 demonstrates different cases of staggered packings. Staggered packings are defined by a pair of adjacent unit circles 21 and 22. The stagger angle A is the angle between the horizontal direction and the direction between centers of these two adjacent circles 21, 22.

The method of the invention replicates periodically this pair of circles horizontally to produce a staggered row of unit circles. Each next pair of circles 23, 24 touches the previous pair. Then the method of the invention replicates periodically staggered rows vertically to produce the staggered periodic circle packing. Each next staggered row touches the previous row. Therefore, two orthogonal directions: horizontal and vertical, and a pair of touching unit circles, or circle and the stagger angle A completely define a periodic staggered packing of the invention.

Any staggered periodic packing is a result of connected transformation of the square lattice and therefore is a lattice for key arrangement of the present disclosure. To prove this fact we may consider 3 intervals of value of stager angle A. Staggered periodic packings for values of stagger angle A between 30 and 60 degrees (FIG. 2a) are true periodic packings, so they are lattices of the disclosure, as it was shown above. For A between 0 and 30 degrees, each circle from the staggered packings has two another circles of the packing vertically adjacent to it and 2 other adjacent circles by construction (FIG. 2b). Therefore, all staggered periodic packings in this interval are lattices. For A between 60 and 90 degrees (FIG. 2c), each packing is diagonally symmetric to the packing with stager angle equal (90−A), so staggered packings in this interval also are lattices. We will call staggered lattice structures with 0<A<30 vertically aligned lattices, with 30<A<60—diagonal lattices, and with 60<A<90 horizontally aligned lattices.

In some embodiments of the disclosure, the square lattice is transformed into a staggered periodic lattice. The keyboard based on a staggered periodic lattice within a rectangular container with horizontal and vertical sides is called a rectangular staggered keyboard.

Other possible values of the stagger angle A may be reduced to the values between 0 and 90 degrees using horizontal and vertical symmetries. For example, angles between 90 and 180 may be mapped to angles between 0 and 90 using vertical symmetry. Therefore, the method may consider only stagger angles between 0 and 90 to construct staggered lattices and keyboards. Keyboards for other stagger angles may be obtained by symmetries of these keyboards.

Further in the text, it is supposed that the diameter of the circles representing keys and key spreading distance is equal to D, the width of the rectangle of a keyboard is equal to W, the height of the rectangle is equal to H, and the number of key circles is equal to N. [W] is the floor value of W. The density of the rectangular keyboard KD is the ratio of the area of all keys to the area of the keyboard rectangle:

$$KD=pi*N*(D*D)/(4*W*H).$$

Staggered Rows

Figure 3:
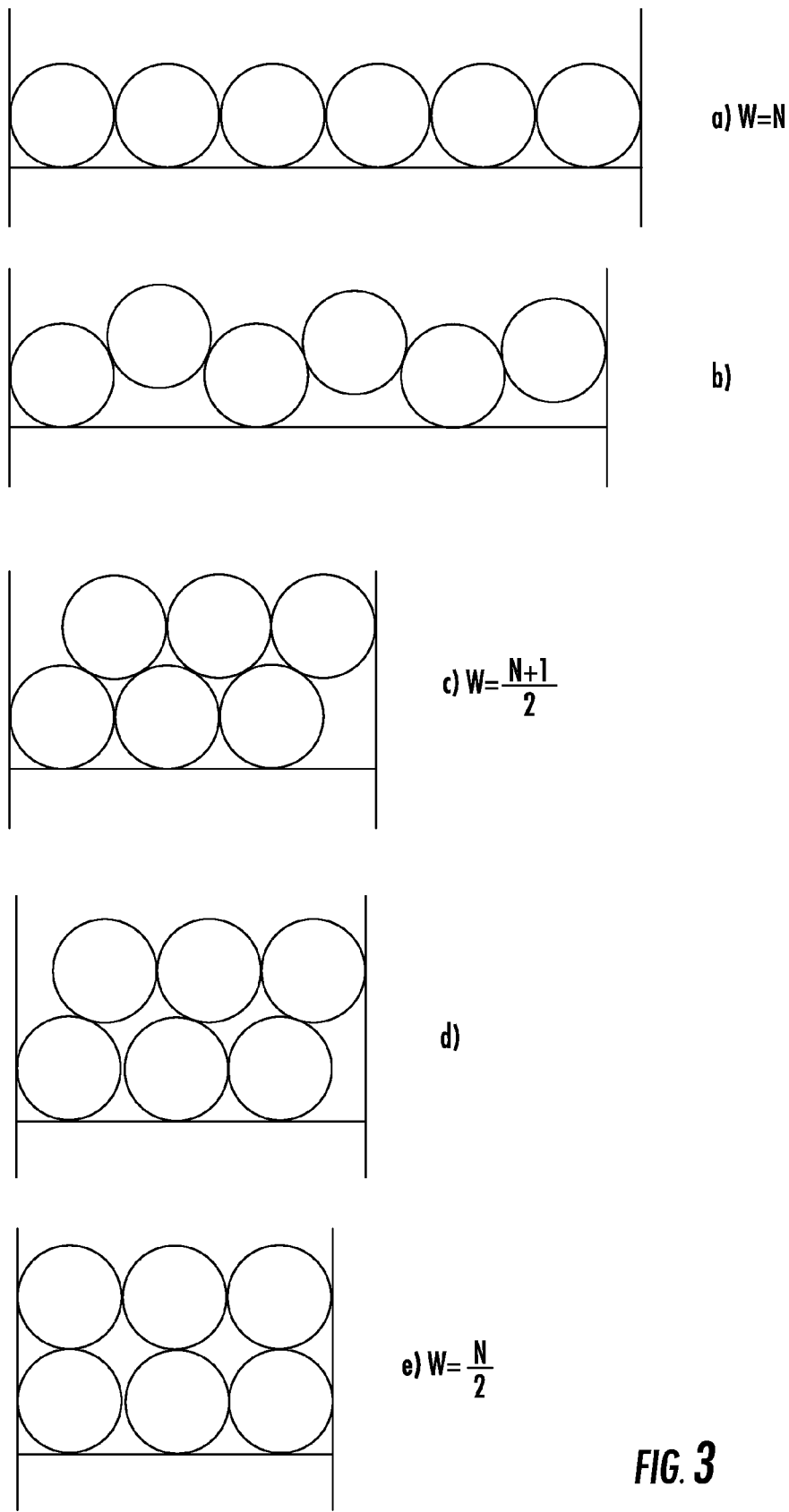
FIG. 3 is a schematic diagram of staggered rows of lattice keyboard arrangements for rectangular containers with different widths, according to the present invention.

This disclosure now considers different cases of possible layouts of a staggered row comprising N unit circles with D=1, depending on the width of the staggered row W, as demonstrated at FIG. 3.

It is evident that if width W is greater then the number of circles N, then the staggered row of the invention could not be constructed, because circles will not touch each other. The optimal periodic row in this case is non-staggered, and centers of keys are evenly distributed along the width of a row. The x-distance X between centers of circles is equal to (W−1)/(N−1). The special case of the optimal staggered keyboard occurs when W=N and the stager angle A is equal to 0 degrees. In this case, the staggered row has a lattice of the square packing, as demonstrated at FIG. 3a.

In the case, when W is between (N+1)/2 and N, the staggered row comprises upper and lower parts, as demonstrated at FIG. 3b. If N is even, both parts of the row are the same and contain N/2 circles. Otherwise, if N is odd, one part contains [N/2] circles and another [N/2]+1. In this case, a staggered row may have two embodiments with different order of parts, which are either vertically or horizontally symmetrical. Centers of unit circles are evenly distributed along the width of a row. The x-distance X between centers of adjacent circles is equal to (W−1)/(N−1). The special case of the optimal keyboard occurs when N=2*W−1, and the stager angle A is equal to 60 degrees. In this case, the staggered row has a lattice of the hexagonal packing, as demonstrated at FIG. 3c.

In the case, when W is between N/2 and (N+1)/2, the structure of periodic staggered layout, as demonstrated at FIG. 3d. This case is possible only for even values of N. If N is odd, staggered row could not be constructed in this case. The x-distance X between centers of adjacent circles in different parts of the staggered row is equal to W−[W]. The special case of the staggered row occurs when W=N/2 and the stager angle A is equal to 90 degrees. In this case, the staggered row of the optimal key comprises two identical parts of square packing, as demonstrated at FIG. 3e. And finally, in the case, when W is less then N/2, the staggered row of such width could not be constructed.

Staggered Keyboards of Given Width

Due the periodic structure of staggered keyboards of the method, layouts of the staggered rows demonstrated in FIGS. 3a-3e determine all possible layouts of the staggered keyboards of given width W. There exists only a limited number of possible different key layouts of the first row of a staggered keyboard with keys of unit size for given width of the rectangle: W<=N<=2*W. The first row of the staggered keyboard fully determines a periodic lattice of key centers and all other rows of the staggered keyboard within a rectangle of a given width, as described above.

This is very beneficial property of the method of the invention, because the method needs to analyze only lattices determined by basic layouts of the first staggered row of a keyboard for W<=N<=2*W, to determine the optimal staggered keyboard for given W. To construct the optimal staggered keyboard in the general case, the method may replicate row by row all possible basic layouts of the first staggered row, until the total number of keys in the keyboard is less then given number of keys. After that, the method determines the height of the resulting arrangements. After processing of all possible layouts of the first staggered row, the arrangement of the keyboard with the minimal height may be selected as the optimal staggered keyboard of given width. After the optimal staggered keyboard for the given width is determined, the system may calculate its density. Therefore, the method of invention provides a simple and accurate solution for the problem of optimal staggered keyboard of given width. The method of the invention provides a determination of the optimal staggered keyboard arrangements for a given number of keys of unit size and a given width of a rectangle. To construct the optimal staggered keyboard of given width W and diameter of keys D, the method may construct the optimal staggered keyboard for unit circles and the width W/D, and then scale it back to needed dimensions.

Staggered Keyboards of Maximum Density

Another objective of the invention may be to determine dimensions of staggered keyboards with given number of keys having the maximum density. That may provide total area saving by using a staggered keyboard of smaller total area. In this case sizes of a keyboard are not fixed. Since the keyboard density KD of the optimal staggered keyboard with given number of keys may be considered as a function of the keyboard width W, the method may determine all local maximums of this function. Further, depending of design requirements, the method may provide either width values of local maximums, which are close to given initial value of the width, or the width value, in which the global maximum of the density is reached. This disclosure calls staggered keyboards' arrangements corresponding to global maximums of the density as staggered keyboards of maximum density.

As it was found, staggered keyboards of maximum density for numbers of keys less or equal to 13 (except 11) are keyboards having square layouts of keys. So, in one embodiment of staggered keyboards of maximum density for small keypads of the invention are square ones. All of them have the same density 0.7854. The typical example of such keyboard is a phone keypad.

Figure 4:
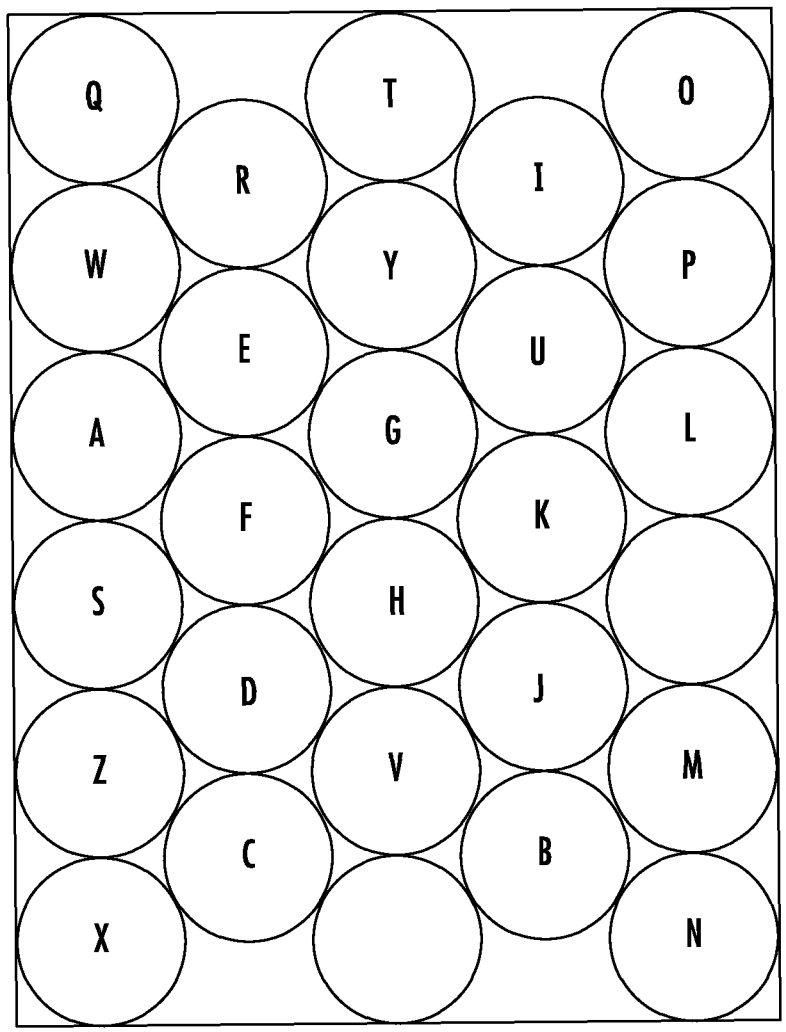
FIG. 4 is a schematic diagram of the embodiment of lattice keyboard with 28 keys having the maximum density, according to the present invention.

For all numbers of keys greater then 13, arrangements of staggered keyboards of maximum density comprise a part of the planar hexagonal lattice within a rectangle. This disclosure defines such keyboards as hexagonal keyboards. The density of hexagonal keyboards increases from 0.7906 for 11 keys approaching to sqrt(3)*pi/6~0.9069 for greater numbers. For embodiments up to 50 keys, keyboards of maximum density have two rows of hexagonal lattice for 11, 15, 16, 18, 19, 22, 25, 31 keys, four rows for 34, 42, 40, 46 keys, five rows for 28, 33, 43, 48 keys, and three rows for all other numbers of keys. FIG. 4 demonstrates a keyboard of maximum density with 28 keys.

Another objective of the method may be: for a rectangular container of given fixed width W and the number of keys N, find the size of keys providing the staggered keyboard with the maximum density. In this case, the method of the invention may consider the keyboard density KD as a function of a key size D, reducing this problem to the problem of the staggered keyboard of maximum density, described above, if we scale keys to unit circles. Linear increase of key sizes is equivalent to linear decrease of the rectangle width and doesn't change the density of a keyboard. Therefore, the problem of staggered keyboard with optimal keys is dually equivalent to the problem of staggered keyboards of maximum density. If extreme points of the density function are found, then the values of width can be scaled back to the given width of a keyboard to get the size of optimal keys. After selection of a layout of the staggered keyboard a user or the method may assign meanings to individual keys.

Staggered Keyboards Preserving Key Assignments

The embodiments of the invention described above provide staggered keyboards with optimal geometrical layouts of keys based only on dimensions of container rectangles and the total number of keys. This case is very important for design of optimal touch interfaces in general, but in many cases, keyboards are determined not only by the number of keys and geometry, but also by an arrangement of assigned input meanings of keys. For example, most of computer keyboards have so called QWERTY layout. It has 3 rows with 10, 9, 7 keys in corresponding rows with letters of Latin alphabet assigned to individual keys. There exists a number of legacy keyboards with defined and standardized layouts of input meaning for different languages, applications and devices. Therefore, it is desirable to preserve a general layout of input meanings and an interposition of keys for staggered keyboards of the invention.

This is another objective of the invention: construct the optimal periodic staggered keyboards of a given width, which preserves the order of rows and the order of buttons in rows for given classic square keyboard with K rows and B buttons in each row. For example, optimal staggered keyboards for QWERTY keyboard may be based on the longest top row containing 10 keys. Staggered keyboards preserving key assignments in and between rows provide a user with a familiar interface of classic keyboards, reduce a learning period, and in the same time due properties of staggered keyboards reduce error rates and increase the speed of input.

The method constructs an optimal staggered keyboard for a given square keyboard with assigned key meanings row by row. At first, the method constructs an optimal staggered row of the given width with B keys. In this way, the method preserves the same order of keys within each row for all rows of an original classic keyboard. Then the method replicates optimal staggered rows vertically into an optimal staggered keyboard preserving the order of all K rows.

Since the number of unit circular keys B in a row of the staggered keyboard of given width W is known, then positions of key centers may be easily and directly calculated. If B is greater or equal W and is less or equal to 2W, positions of all keys in the first staggered row of the keyboard may be calculated as it was described above for FIGS. 3a-3e. If B is less then W, then staggered layout of the invention cannot be constructed, since such layout requires more then one row of initial keyboard for a row of the staggered keyboard. If B is greater then 2W, then staggered layout of the invention cannot be constructed, since such layout requires more then one staggered row for a row of the initial keyboard. The described process provides construction of optimal staggered keyboard of given width with keys of given size and preserving the assignment of input means of a classic keyboard within a rectangular container of given width.

Staggered Keyboards of Given Dimensions

Another objective of the invention is for a rectangle of given dimensions W and H, construct a staggered keyboard preserving key assignment of a classic square keyboard and having a maximum key spreading distance. Differently to the previous objective, in this case, the length of both sides is given, but the diameter of a circle is variable.

Since the number of rows K and the number of keys B in a row of a square keyboard are known, the method may directly calculate the optimal geometrical layout of the staggered keyboard. There are several cases of optimal keyboard layouts depending on ratio of sizes of the rectangular container of a staggered keyboard, and ratio of numbers of rows and keys in rows of the original classic keyboard.

1) Keyboard Narrowing. W/H<B/K

In this case, a staggered keyboard becomes narrower then the original keyboard. The ratio of sides of a staggered keyboard depends on the stagger angle A between centers of the first two circles in the first row of the staggered keyboard. Further, X and Y are horizontal and vertical distances between centers of the first two circles in the first row of the staggered keyboard. For the original classic keyboard, the stagger angle A=0, and distances X=D, Y=0.

Figure 5:
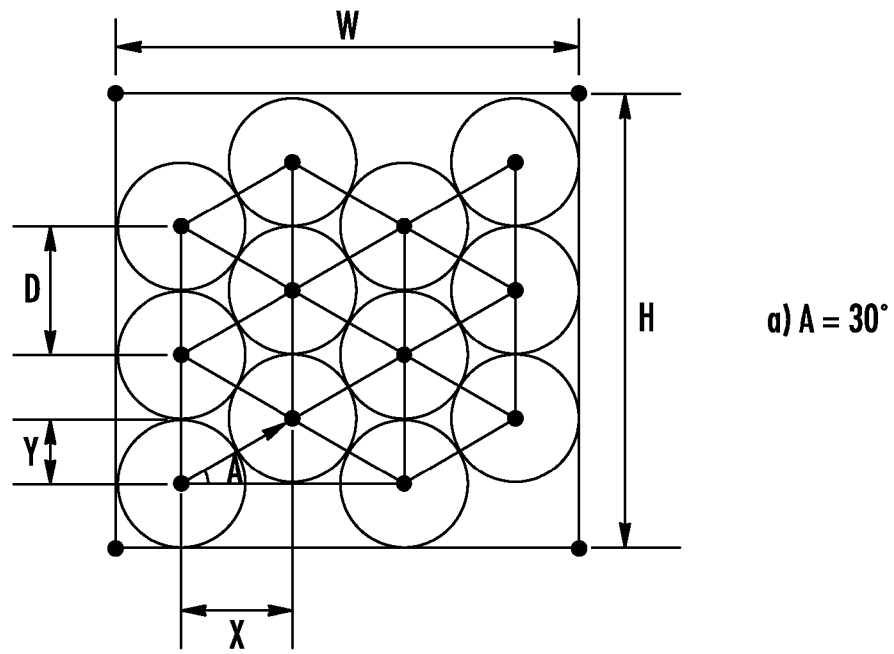
FIG. 5 is a schematic diagram illustrating different cases of determination of parameters of staggered circular lattice keyboard having given sizes depending on scale ratio, according to the present invention.
Figure 5:
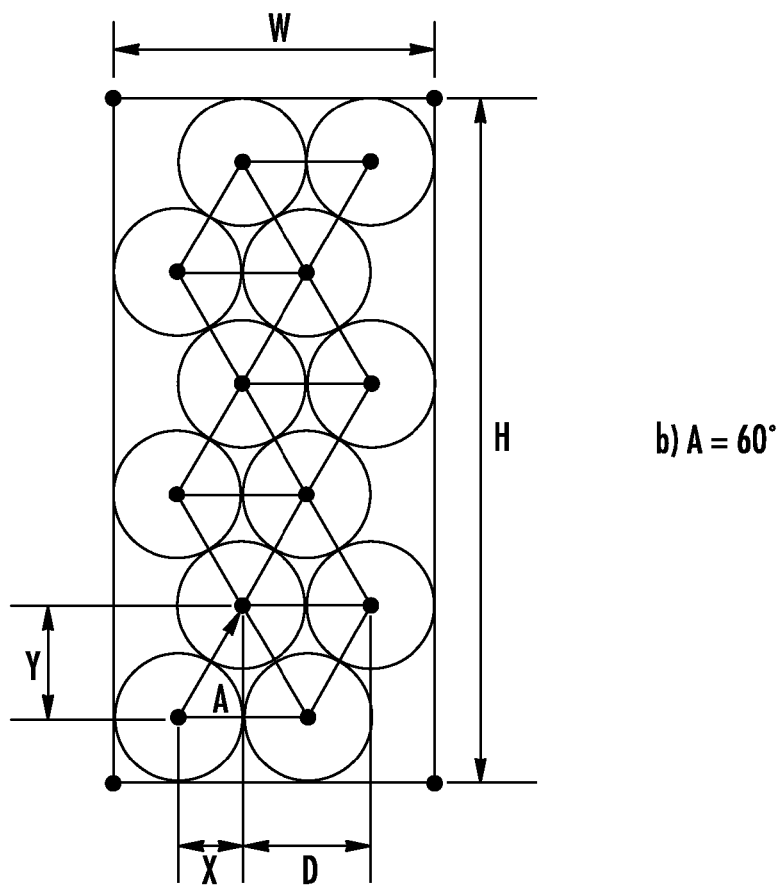

There are three subcases corresponding to 3 cases of the structure of staggered lattice:

a) W/H>(2+(B−1)*sqrt(3))/(2K+1). In this case, the stagger angle A is: 0<A<=30 degrees. FIG. 5a demonstrates the vertically aligned hexagonal staggered keyboard in case when A=30.

The diameter D of keys of the optimal staggered keyboard may be calculated from the following system of equations:

$$Y+D*K=H; D+(B-1)*X=W; X^2+Y^2=D^2.$$

This system is equivalent to the following square equation:

$$(H-D*K)^2+((W-D)/(B-1))^2=D^2.$$

Further, after resolving this equation, the method may find the value of diameter D of keys of the staggered keyboard in this case.

b) W/H>(B+1)/(2+(2K−1)*sqrt(3)).

In this case the stagger angle A is: 30<A<=60 degrees. FIG. 5b demonstrates the horizontally aligned hexagonal staggered keyboard in case when A=60.

In this case, the diameter D of keys of the optimal staggered keyboard may be calculated from the following system of equations:

$$D+(2*K-1)*Y=H; D+(B-1)*X=W; X^2+Y^2=D^2.$$

This system is equivalent to the following square equation:

$$((H-D)/(2*K-1))^2+((W-D)/(B-1))^2=D^2.$$

Further, after resolving this equation, the method may find the value of diameter D of keys of the staggered keyboard in this case.

If B is odd, then A=60 is the maximum possible value for stagger angle and horizontally aligned hexagonal staggered keyboard at FIG. 5b is the densest keyboard.

c) W/H>B/(K*4) and B is even.

In this case, the stagger angle A is: 60<A<=90 degrees.

In this case, the diameter D of keys of the optimal staggered keyboard may be calculated from the following system of equations:

$$D+(2*K-1)*Y=H; X+(B/2)*D=W; X^2+Y^2==D^2.$$

This system is equivalent to the following square equation:

$$((H-D)/(2*K-1))^2+(W-(B/2)*D)^2=D^2.$$

Further, after resolving this equation, the method may find the value of diameter D of keys of the staggered keyboard in this case.

If the stagger angle is equal to 90 degrees, the staggered keyboard has a square lattice of centers of keys with the second half of the staggered row straight above the first half.

2) Keyboard Widening. W/H>B/K

In this case, a staggered keyboard becomes wider then the original square keyboard. The method of the invention may reduce this case to the case of narrowing described above by swapping sides of the container rectangle. The width becomes the height, and vice versa. Therefore, widening of the original rectangle becomes narrowing of the rectangle with swapped sides, and the method of the invention may use all above formulas for calculation of the diameter of keys and structure of lattice of the optimal staggered keyboard.

Therefore, the method of the invention can construct an optimal staggered keyboard with given sides preserving key assignment of a classic keyboard for all ratios of sides in the range: (B/K)*4>W/H>(B/K)/4.

Staggered Button Keyboards

Many embodiments of touch recognition devices represent a touch by coordinates of a single touch point and a key with the center nearest to the touch point is recognized as touched. In this case, keyboards are actually keyless. The shape of keys doesn't impact to touch recognition, and virtual keys of such keyboards may be represented by circles adjacent to each other. The key spreading distance is equal to the diameter of key circles.

Figure 6:
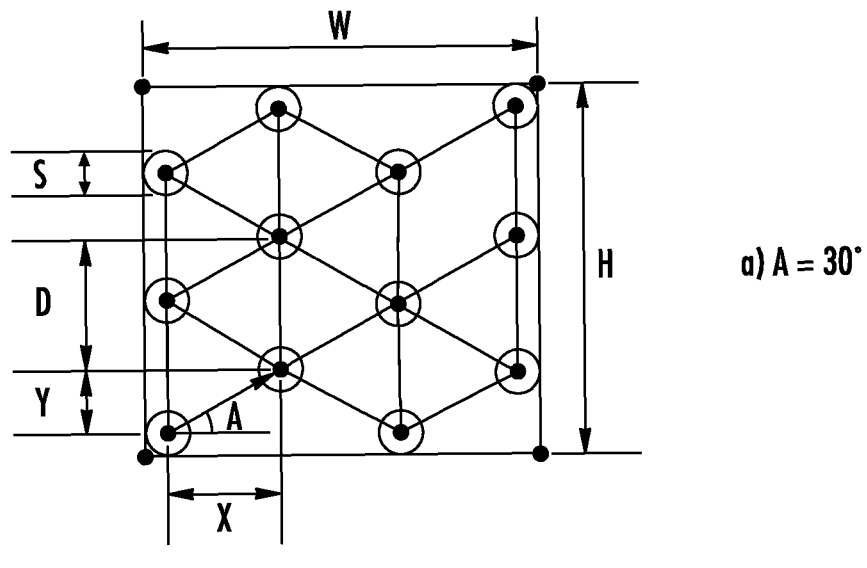
FIG. 6 is a schematic diagram illustrating different cases of determination of parameters of staggered button lattice keyboard having given sizes depending on scale ratio, according to the present invention.
Figure 6:
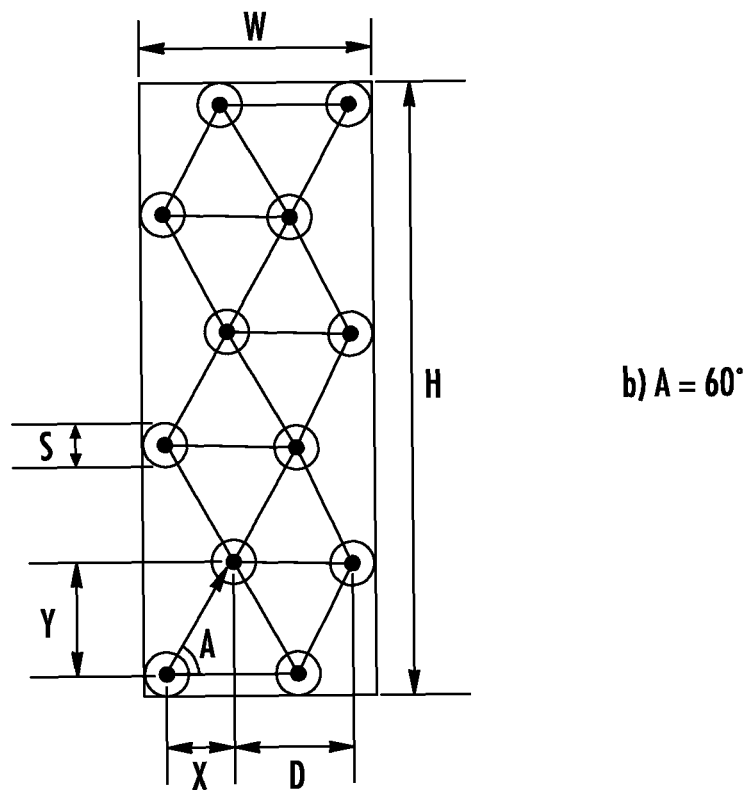

In other embodiments, some touch devices may provide advanced information on a size and a shape of touch tip area, so the method of the invention may recognize do a finger touch area and a key shape intersect or not. For many embodiments of hardware keys, the activation of a button also occurs when a finger touch area intersects with shape of a button. The method of the invention also may be applied to such button keyboards. Buttons of such keyboards may be smaller then the key spreading distance and may have any shape. The method of the invention supposes that a shape of a button is located within a bounding circle of diameter S. The center of the bounding circle coincides with the node of a keyboard lattice. The value of S may vary from 0 to the value of the spreading distance D. The method of the invention supposes that a shape of a finger touch area is a circle of diameter F. The value of D should be greater then F/2, because in the opposite case finger area may intersect with several buttons. FIGS. 6a-6b demonstrate embodiments of a hexagonal lattice button keyboards having the same key lattice as for the staggered keyboards at FIG. 5a-5b.

In the embodiment of button keyboard, it is beneficial to solve the button spreading problem instead of the circle packing problem. The optimal button keyboard should have a maximum value of key spreading distance.

In this embodiment of the present disclosure, the objective of the method of the invention is to construct the optimal staggered button keyboard for the given rectangle (W,H), diameter of buttons S and a layout of a classic keyboard. Since number of rows K and keys in a row B are known, the method may directly calculate the staggered point lattice of the optimal button keyboard.

As for circular staggered keyboards, there are two principal cases of widening and narrowing of the original square keyboard, each comprising 3 subcases. Further, A is a stagger angle, D is a distance between centers of keys and a key spreading distance, and X and Y are horizontal and vertical distances between centers of first two buttons in the first row of the staggered button keyboard. For the original classic keyboard, the stagger angle A=0, and distances X=D, Y=0.

1) Keyboard Narrowing. (W−S)/(H−S)<(B−1)/(K−1)

Different from the case of circular keyboards, the narrowing is determined by distances between centers of keys, but not the total dimensions of a keyboard. There are three subcases corresponding to 3 cases of the structure of staggered lattice:

a) (W−S)/(H−S)>(B−1)*sqrt(3)/(2K−1).

In this case, the stagger angle A is: 0<A<=30 degrees. FIG. 6a demonstrates the vertically aligned hexagonal staggered button keyboard in case when A=30.

The key spreading distance D of the optimal staggered button keyboard may be calculated from the following system of equations:

$$Y+D*(K-1)+S=H; (B-1)*X+S=W; X^2+Y^2=D^2.$$

This system is equivalent to the following square equation:

$$(H-S-D*(K-1))^2+((W-S)/(B-1))^2=D^2.$$

Further, after resolving this equation, the method may find the value of key spreading distance D of the optimal staggered button keyboard in this case.

b) (W−S)/(H−S)>(B−1)/((2K−1)*sqrt(3)).

In this case, the stagger angle A is: 30<A<=60 degrees. FIG. 6b demonstrates the horizontally aligned hexagonal staggered button keyboard in case when A=60.

The key spreading distance D of the optimal staggered button keyboard may be calculated from the following system of equations:

$$(2*K-1)*Y+S=H; (B-1)*X+S=W; X^2+Y^2=D^2.$$

This system is equivalent to the following equation:

$$((H-S)/(2*K-1))^2+((W-S)/(B-1))^2=D^2; \text{ and}$$

$$D=\text{sqrt}(((H-S)/(2*K-1))^2+((W-S)/(B-1))^2).$$

If B is odd, then A=60 is the maximum possible value for stagger angle, and horizontally aligned hexagonal staggered button keyboard at FIG. 6b is the densest button keyboard.

c) (W−S)/(H−S)>(B−1)/((K−1)*4) and B is even.

In this case, the stagger angle A is: 60<A<=90 degrees.

The key spreading distance D of the optimal staggered button keyboard may be calculated from the following system of equations:

$$(2*K-1)*Y=H; X+(B/2-1)*D+S=W; X^2+Y^2=D^2.$$

This system is equivalent to the following square equation:

$$((H-S)/(2*K-1))^2+(W-S-(B/2-1)*D)^2=D^2.$$

Further, after resolving this equation, the method may find the value of key spreading distance D of the optimal staggered button keyboard in this case.

If the stagger angle is equal to 90 degrees, the staggered button keyboard has a square lattice of point keys with the second half of the staggered row straight above the first half.

2) Keyboard Widening. (W−S)/(H−S)>(B−1)/(K−1)

In this case, a staggered button keyboard becomes wider then the original keyboard. As for keyless staggered keyboards, the method of the invention reduces this case to the case of narrowing described above by swapping sides of the container rectangle. The width becomes the height, and vice versa. Therefore, widening of the original rectangle becomes narrowing of the rectangle with swapped sides, and the method of the invention may use all above formulas for calculation of the key spreading distance and structure of lattice of the optimal staggered button keyboard.

True periodic lattices, corresponding to stagger angles A between 30 and 60 degrees, are connected transformations of the diagonal square lattice within a rectangle. The diagonal square lattice corresponds to the angle of 45 degrees. The diagonal square lattice having sizes (W,H), maybe transformed into true periodic diagonal lattices having sizes between (H*sqrt(1/2), W*sqrt(3/2)) for stagger angle of 30 degrees, and (H*sqrt(3/2), W*sqrt(1/2)) for stagger angle of 60 degrees. These hexagonal lattices are equivalent to hexagonal lattices transformed from axial square lattices having sizes ((H−1)*sqrt(1/2), W*sqrt(2)) for stagger angle of 0 degrees, and (H*sqrt(2), (W−1)*sqrt(1/2)) for stagger angle of 90 degrees. Therefore, lattices of staggered keyboards for all possible values of a stagger angle A are results of connected transformations of either diagonal, or axial square lattices.

Comparing to circular staggered keyboards, staggered button keyboards may save extra space around the border, which were occupied by circles adjacent to the border of a staggered circular keyboard. Further different embodiments of staggered keyboards of the present disclosure are described in detail.

Virtual Staggered Keyboards

The method of the invention may be very beneficial for design of virtual on-screen keyboards for mobile devices adjustable to screen sizes. On-screen keyboards usually have two orientations: landscape and portrait. Most of existing on-screen keyboards imitate the rectangular block geometry and straight horizontal rows of the legacy QWERTY computer keyboard for both orientations. That leads to some problems: keys have very different shapes in two modes, key spreading distances within and between rows are different, portrait keyboards have very small and narrow keys, which is difficult to use. Also, landscape keyboards are too big and hide the most part of the screen.

In some embodiments of virtual keyboard of the invention, input meanings of keys in rows of the legacy keyboard may be assigned to rows of staggered keyboard. To preserve the interpositions of letters and their relative order in the original keyboard matrix, the method at first creates a staggered keyboard for the longest row of the keyboard and then replicate its' structure for other rows.

In one embodiment, the method of the present disclosure may provide two layouts of an adjustable staggered keyboard for landscape and portrait orientations preserving number of keys, key size and spreading distance, which may be determined by a user. In both layouts, symbols preserve their relative positions within and between rows. These keyboards have width equal to width of the screen in each orientation.

Figure 7:
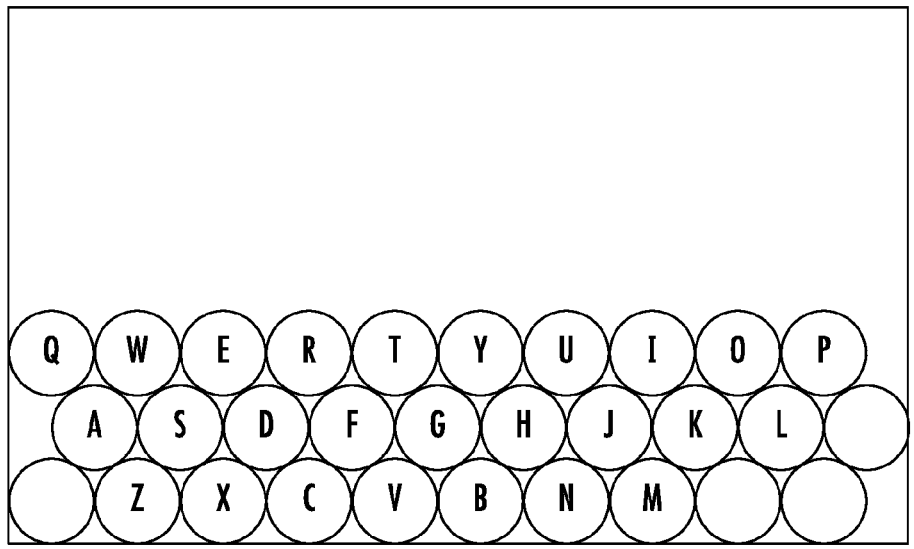
FIG. 7 is a schematic diagram of one of possible embodiment of the QWERTY lattice keyboard with 30 keys in three rows for portrait and landscape modes, according to the present invention.
Figure 7:
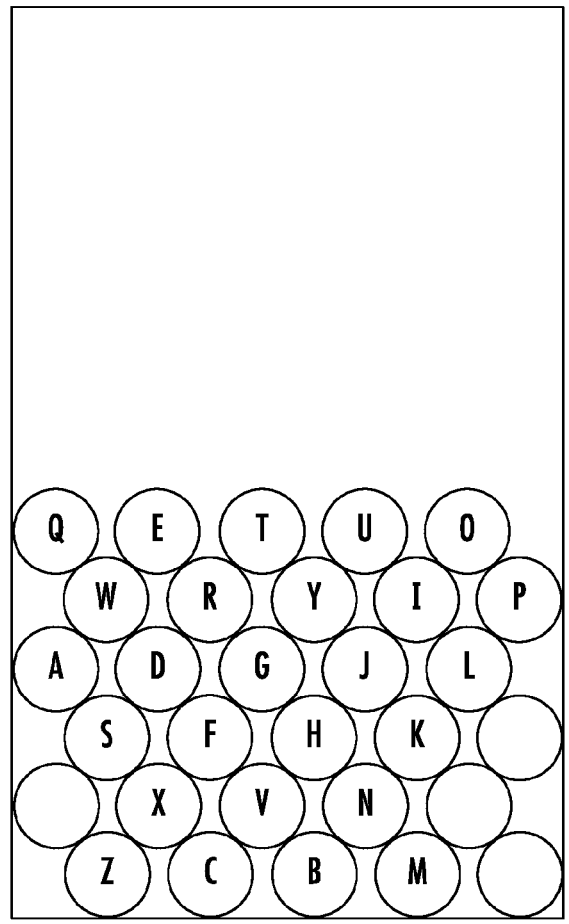

For example, embodiments of the alphabet part of the QWERTY staggered keyboard having screen width for portrait and landscape orientations for a screen with side ratio 9:15 is illustrated at FIG. 7. Both keyboards have 30 keys in three rows. In the landscape orientation (FIG. 7a), the keyboard may have a layout of horizontally aligned hexagonal keyboard. The layout determines the size of keys: 15/10.5~1.43 units. In the portrait orientation, keys of this size determine the corresponding staggered arrangement illustrated at FIG. 7b. The spreading distance and size of keys are the same as for the landscape mode.

Figure 8:
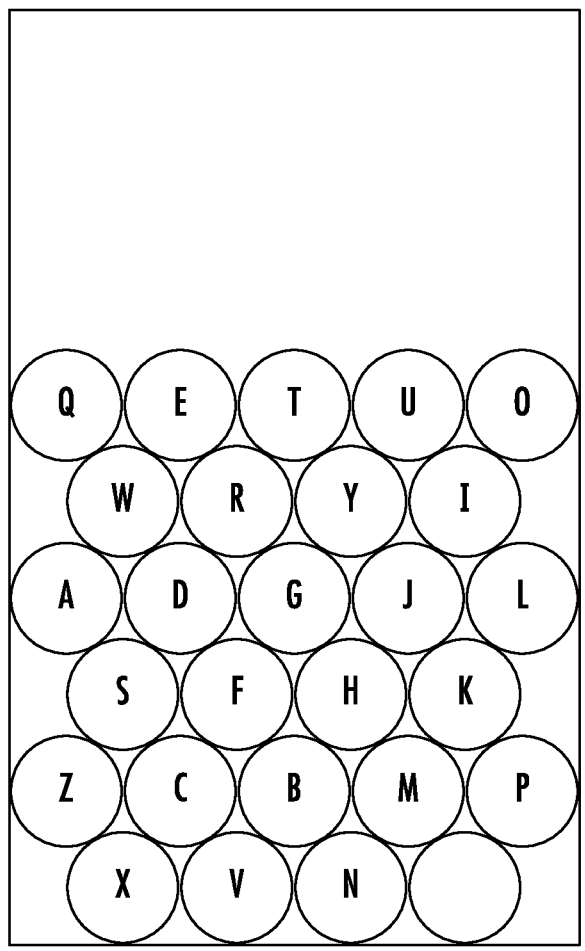
FIG. 8 is a schematic diagram of a modified QWERTY lattice keyboard with 27 keys in three rows for portrait and landscape modes, according to the present invention.
Figure 8:
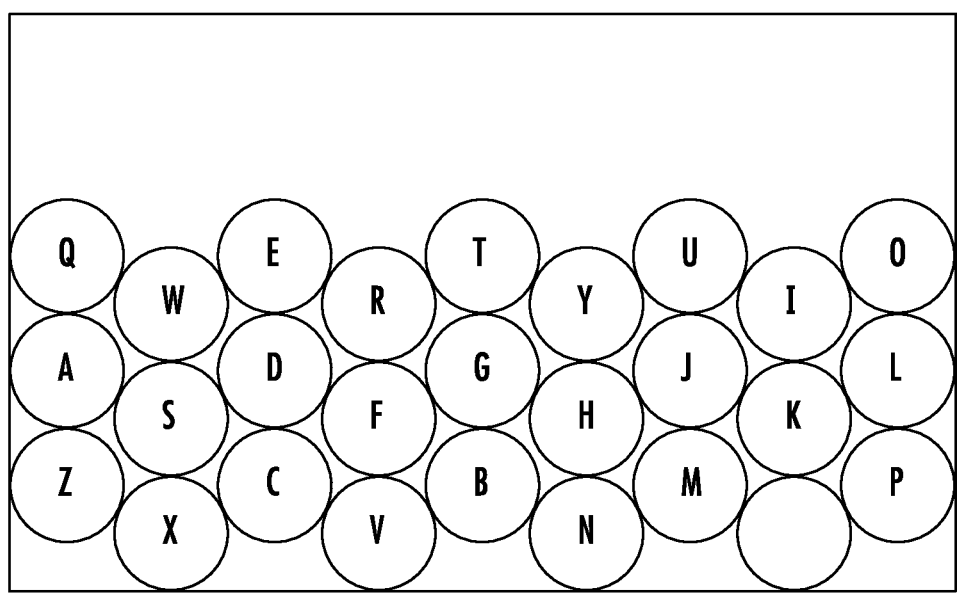

Another embodiment of the staggered keyboard of the invention with slightly modified QWERTY layout for letter P is illustrated at FIG. 8. It has 27 keys in three staggered rows. For the portrait orientation, the staggered keyboard has the vertically aligned hexagonal layout (FIG. 8a). The size of keys and spreading distance are equal to 9/5=1.8 units. This is in two times greater then the key spreading distance for traditional portrait keyboards 9/10=0.9. In the landscape orientation, this size of keys determines a staggered keyboard arrangement illustrated at FIG. 8b.

In the general case, the user may determine the size of keys, spreading distance, the number of rows, the numbers of key and key assignments in rows, and the method of the present disclosure may generate the optimal staggered keyboard preserving the original layout of input meanings and adjusted to given width of screen.

Keyboards of the disclosure may not include dedicated keys for many control actions like DELETE, SHIFT, SPACE, RETURN. Many of such actions may be implemented using simple flick swipes in four directions.

Float and Resizable Keyboards

Embodiments of adjustable staggered keyboards described in the previous sections have a width equal to the width of a screen in a particular orientation and are docked to the bottom of the screen. In the general case, virtual keyboards of the method may have any dimensions within the screen and be placed at any place at the screen.

A unique beneficial feature of adjustable staggered keyboards of the present disclosure is that the resizing of staggered keyboards is uniform and preserves the shape of keys and proportions of any images assigned to keys. Staggered keyboards of any size have the same key spreading distance for all keys of a keyboard.

Resizing of classic matrix virtual keyboards has many drawbacks. It is not uniform and is a composition of horizontal and vertical scaling. It does not preserve key spreading distance, which is different within and between rows of classic keyboards. It also doesn't preserve shapes of keys, and they may become very narrow or very short. That may lead to problems with symbol placement and selection of keys, which may make resized classic keyboards difficult to use and be a reason of increased number of errors and misprints.

Lattice keyboards of the present disclosure resolve all issues of resizing of classic matrix virtual keyboards and radically improve usability of virtual keyboards.

Figure 9:
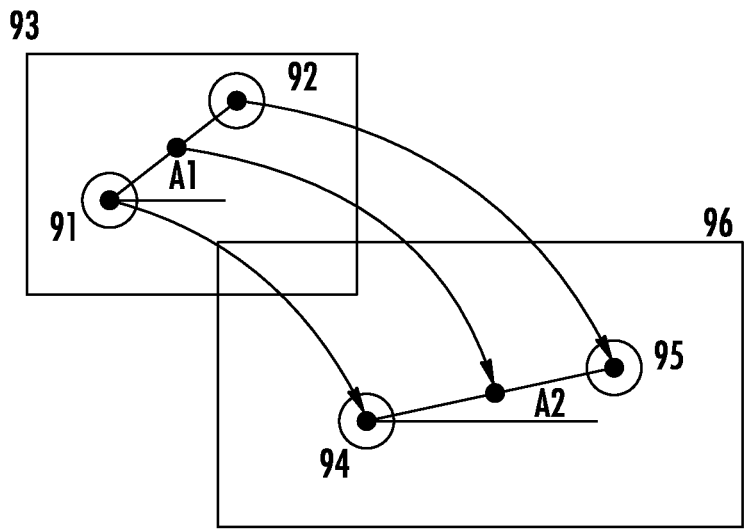
FIG. 9 is a schematic diagram illustrating two-finger interface for determination of position and sizes of float virtual keyboard, according to the present invention.

The method of the present disclosure may provide a simple user interface for interactive keyboard transformation, based on tracking of touch positions 91, 92 of two fingers over the rectangle of a keyboard 93, as demonstrated at FIG. 9. Fingers moved into positions 94, 95, transforming the keyboard rectangle into 96. The displacement of the center of a segment between two positions may determine a displacement of a keyboard. Angle difference between directions of segments A1, A2 may determine a stagger angle of a transformed keyboard. The ratio of lengths of the segments may determine a scale of a transformed keyboard. Other methods for determination of parameters of keyboard transformation also may be used by the method of the present disclosure.

Such user interface provides a clear feedback to user actions and allows a user to set desired size and position in a simple and quick way. During transformations, the method usually preserves relative positions of fingers over transformed keyboard. A user may set any desired dimensions and position of the keyboard at any time, and the method of the present disclosure may construct an optimal staggered keyboard of those dimensions.

Keyboard Customization

Figure 10:
FIG. 10 is a schematic diagram of the lattice keyboard for Cyrillic alphabet with 36 keys in three rows, according to the present invention.

The method of the preset disclosure is applicable to very different keyboard layouts representing inputs for different languages, applications and systems. An example of the staggered keyboard with 3 rows and 12 keys per row for Cyrillic alphabet is presented at FIG. 10. The method also may be used for design of optimal staggered keyboards for languages with large number of input elements, like syllabic or logographic languages.

Figure 11:
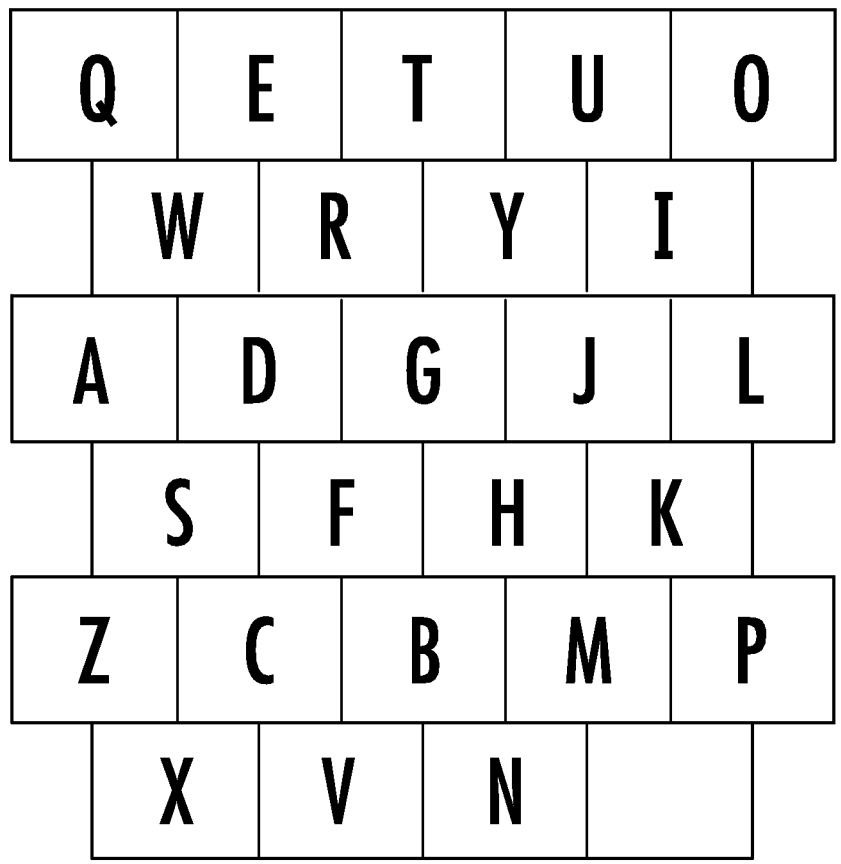
FIG. 11 is a schematic diagram of the arrangement of lattice keyboard with keys having a rectangular shape, according to the present invention.

In one embodiment, the method of the invention is based on the maximization of a minimal distance between key centers, so as it was mentioned before, the shape of keys doesn't impact on the method. Shapes of keys of staggered keyboards of the present disclosure are not limited to circles or dots. The may use keys of arbitrary shapes with centers in nodes of the periodic staggered lattice. For example, FIG. 11 demonstrates a staggered keyboard of the invention with keys having a rectangular shape. This keyboard has a hexagonal key lattice. The spreading distance between centers of adjacent keys is the same for all keys of this keyboard.

Figure 12:
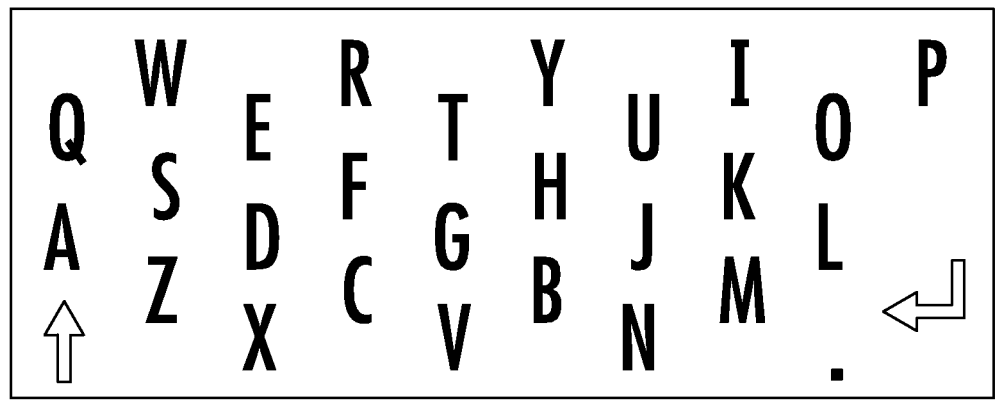
FIG. 12 is a schematic diagram of the keyless arrangement of lattice keyboard, according to the present invention.

Another embodiment of key shapes of the method may be based on Voronoi diagram for a given set of points in nodes of lattice of a staggered keyboard. Each cell of Voronoi diagrams represents a set of points closest to a given one and may be used as a key shape for this point. Staggered keyboards of the present disclosure also may have no key shapes displayed at all, as demonstrated at FIG. 12.

Only symbols placed into nodes of a periodic staggered lattice may be presented to users. This keyless embodiment is beneficial for displaying symbols of larger size to avoid visual intersection with images of key shapes and to facilitate input for persons with vision disabilities. Such keyless embodiments have simple and clear design. Keyless embodiments may be beneficial for implementation of hardware pinboard and membrane keyboards, which have no physical keys.

Keys, background, and symbols of staggered keyboards may have any color, image background and be semi- or completely transparent. Keyboards of the current disclosure may provide different types of input assistance and feedback, including static and dynamic visual, tactile, vibration, and audio.

Transformable Grid Interfaces

Many user interfaces are based on different grid arrangements of clickable input items. For example, most of mobile OS use grids of icons for application access. These grids usually have different layouts for portrait and landscape orientations of a device, confusing users. For example, an implementation of iOS 7 for iPad has 5 rows of 4 items in portrait orientation and 4 rows of 5 items in landscape orientation, so some items are in different rows in different orientations. Some of mobile OSs do not provide landscape layouts at phones due this issue and higher ratio of sides. Selection menus are another example of input grid interface. In many applications, these menus have fixed dimensions and are not scalable to arbitrary sizes of windows, reducing usability of applications. Accordingly, one of the objectives of the present disclosure is construction of improved transformable grid layouts, thereby preserving item interpositions for clickable grid interfaces within rectangles.

Figure 13:
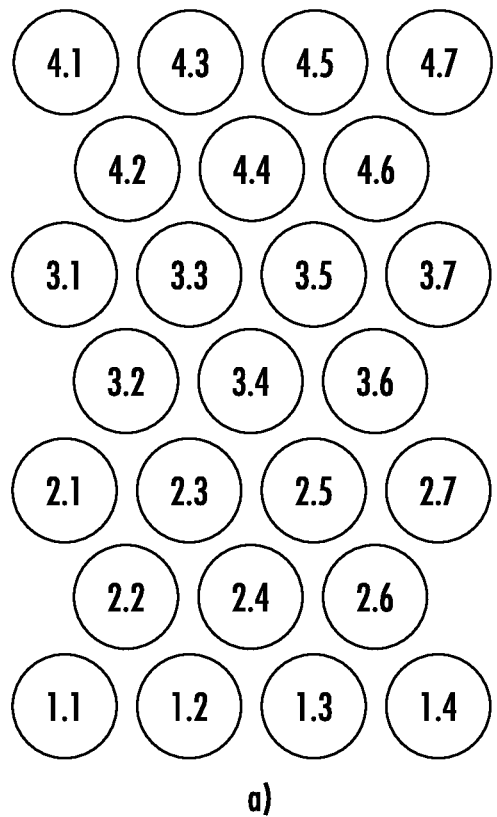
FIG. 13 is a schematic diagram of a transformable grid interface with 25 items for portrait and landscape modes, according to the present invention.
Figure 13:
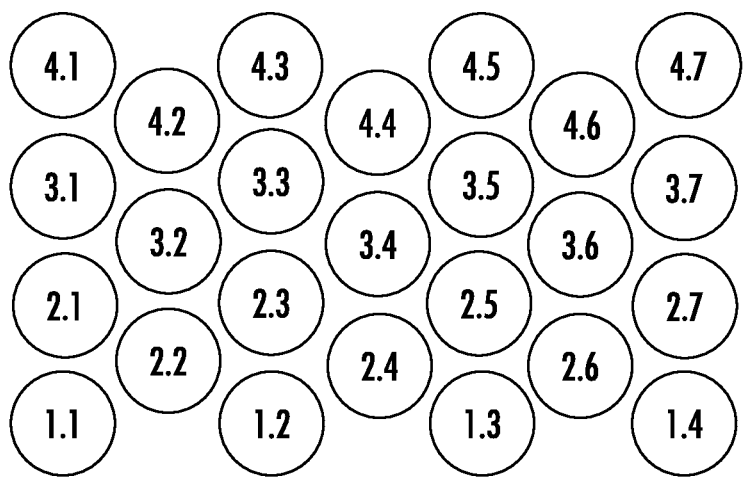

The method of the disclosure may use the procedure for calculation of parameters of staggered button keyboard described above for determination of parameters of transformable grid interfaces. Images of input items may be placed into and determine the diameter of round buttons. Screen sizes determine a rectangle. The example of such grid input interface having 25 input items in two different orientations is demonstrated at FIG. 13. FIG. 13*a* demonstrates a grid interface in portrait orientation, and FIG. 13*b* in landscape orientation. Same input items have the same indexes. This grid interface preserves relative interpositions of all items of the interface for all possible orientations and sizes of a screen or a window.

In one embodiment of the lattice structure of grid interfaces, this embodiment is a diagonal true periodic staggered lattice. Transformable grids provide a universal and flexible tool for improving usability of grid user interfaces of different operation systems and applications. It may provide a new look for OS for a wide range of devices and systems.

Hardware Staggered Keyboards

The method of the disclosure may be used for design of optimal layouts for hardware staggered keyboards with given number of keys or/and layout of input symbols. Keys of staggered hardware keyboards of the invention may be implemented using any existing and future technologies, like mechanic keys, membrane keys, touch buttons, printed or painted resistive and capacity buttons. Keys may be activated by interaction between input object and keyboard of any physical nature: electronic, mechanical, electromechanical, magnetic, optical, acoustic and proximity. Input object may be a finger, a thumb, a stylus, a pen, a laser pointer, a cursor, and an image of an object.

The method may be very beneficial for design of custom hardware control panels and dashboards with a large number of keys for different industrial, scientific, military and consumer devices and system. Increased key spreading distance of keyboards of the present disclosure may reduce the number of input errors, and correspondingly a number of wrong control actions, and therefore improve usability, reliability and safety of devices and systems using lattice keyboards for input and control.

The method is also beneficial for keyboards and keypads having small or custom dimensions for different mobile and portable devices, such as phones, watches, media players, remote controls. Optimal staggered keyboards may be designed to fit to limited space of a device and to provide a maximum comfort for users. Staggered keyboards of the invention also may be implemented as accessory keyboards or embedded in device's covers or cases to provide more screen space during the input. Custom staggered keyboards may provide an additional level of comfort and input accuracy comparing to traditional keyboards, because they may be adjusted to any space limitation of devices.

Figure 21:
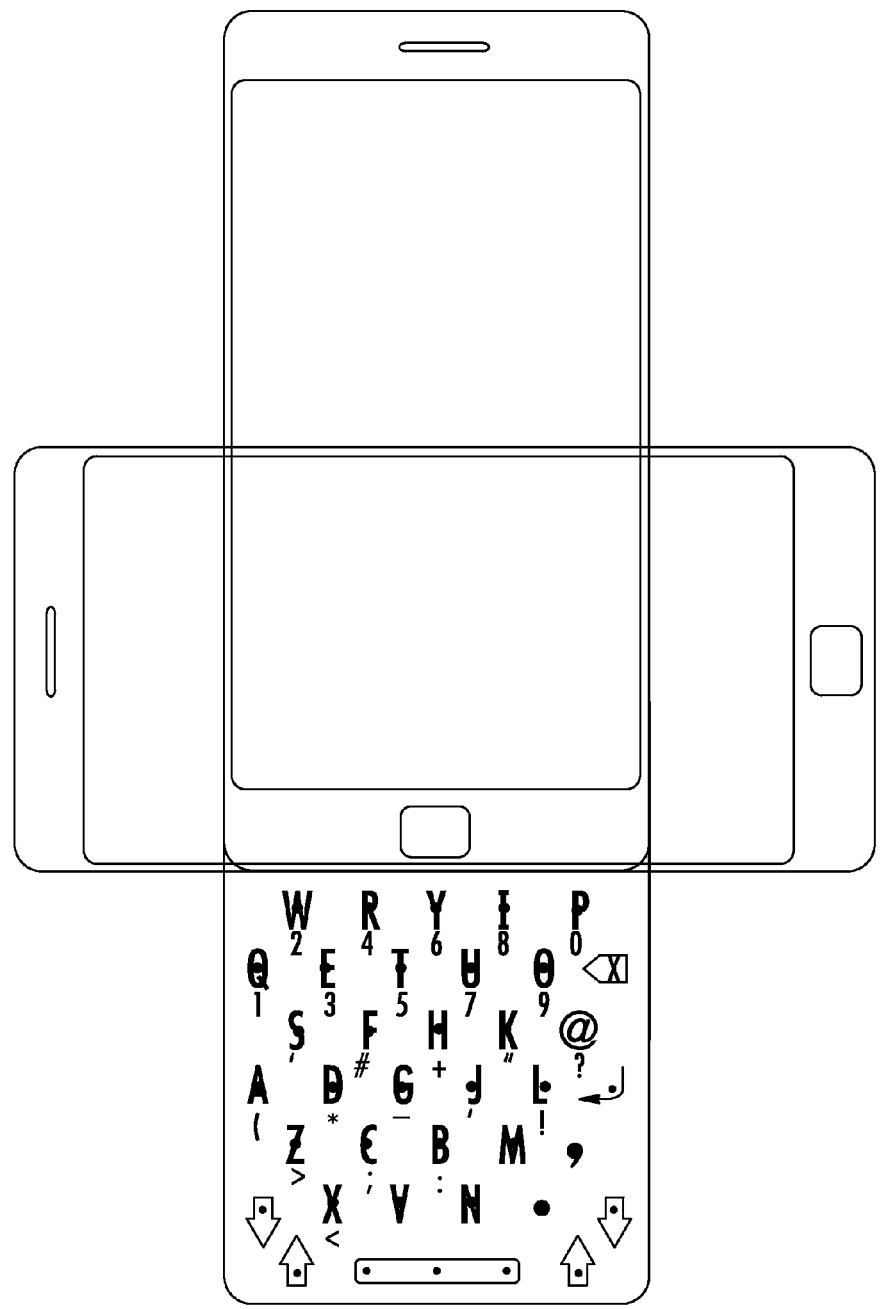
FIG. 21 is a schematic diagram illustrating an embodiment of a hardware QWERTY keyboard, according to the present invention.

Compact staggered keypads of the current disclosure may be beneficial for mobile input. They may provide the full set of symbols of a regular keyboard, but have a reduced size comfortable for transportation and operation. An example of a lattice keyboard for a mobile phone is demonstrated at FIG. 21. This keyboard may be a part of the body of a device, or implemented as a cover, a sliding, a rotating or a magnetic attachment and be used in both orientations of a device.

Pinboards

One embodiment of the staggered hardware keyboard of the invention may use pin keys. Pin keys of the invention have a reduced diameter; it may be just a few millimeters or less. Pin keys may be considered as dots. Staggered hardware pinboards may be implemented using any of technologies for regular keys, mentioned above.

Figure 14:
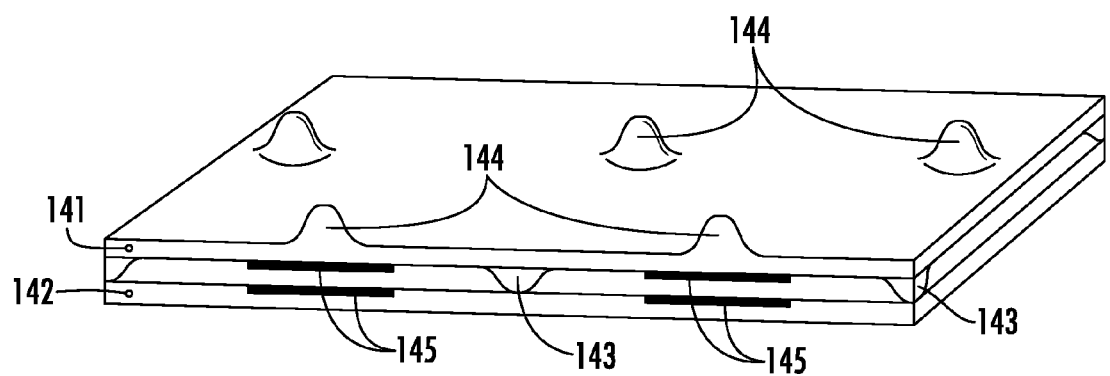
FIG. 14 is a schematic diagram of a lattice pinboard having touch knobs in nodes of key lattice over the surface of touch sensor, according to the present invention.

In one embodiment, demonstrated at FIG. 14, pin keys may be implemented as solid small knobs over the flat surface of a touch sensor. The pinboard demonstrated at FIG. 14 has two layers 141 and 142, separated by spacers 143. The pin keys are activated, when electric contacts 145 under corresponding knobs 144 are connected. These knobs 144 may provide a necessary tactile feedback to user, confirming key activation. The surface 141 of the sensor may also be flexible to provide an additional tactile. The keyboard system of the disclosure may provide an additional mechanical, visual and audio feedback. The pinboard of this design is completely flat, has no moving parts, and differently to existing flat keyboards provides a wide range of user feedbacks. It may have no drawn key shapes and be keyless. Touch sensor may be implemented using any sensor technology, for example, capacity sensors.

Hardware staggered pinboards have an important benefit comparing to keyboards with regular keys. They may provide a reduced key spreading distance, but preserve usability, comparing to keyboards with full size buttons.

Figure 15:
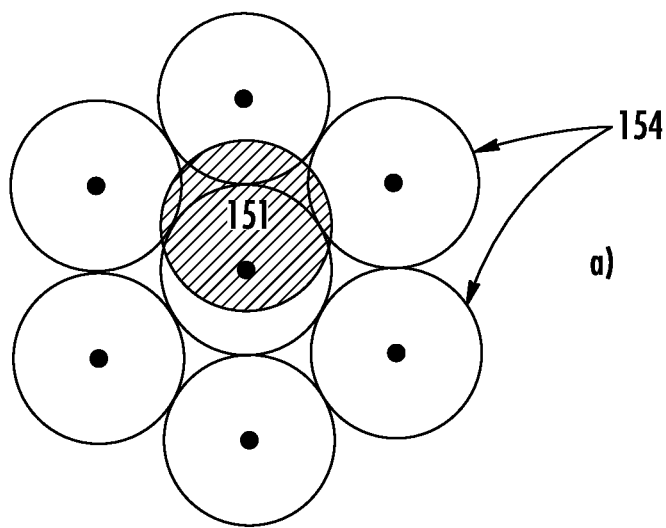
FIG. 15 is a schematic diagram illustrating different embodiments of lattice keyboard depending on radius of buttons and safe displacement distance, according to the present invention.
Figure 15:
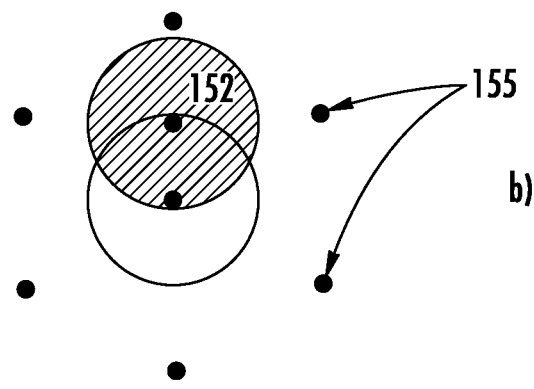
Figure 15:
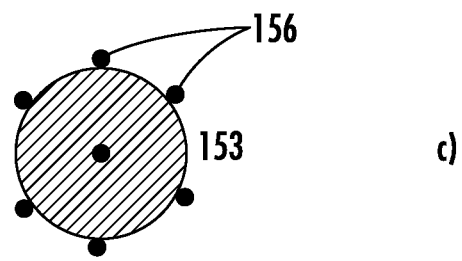

FIG. 15a demonstrates a part of a hexagonal keyboard of the disclosure with circular buttons 154 having a diameter S and key spreading distance D equal to the size of average human finger tip F (about 19 mm). Any touch of the keyboard with position of the center of fingertip in the center of a button activate only this button, but if the fingertip 151 is displaced from the center of button, then this will result in activation of this and some other adjacent buttons. The safe displacement is a distance, to which a finger may move from the center of a key without activating other keys. The safe displacement for keyboard 16a is equal to 0.

Increased safe displacement distance improves usability of a keyboard and reduces error rates. A reduction of size of buttons increases the value of safe displacement. FIG. 15b demonstrate a part of a hexagonal pinboard with small, about zero size pin keys 155 having the same key spreading distance D=F as the keyboard at FIG. 15a. Any touch 152 of the pinboard with position of the center of fingertip within a circle with radius F/2 of a target pin will result in activation of only this target pin. Therefore, a pinboard of the current disclosure at FIG. 15b have the value of safe displacement equal to a half of finger size.

The method may reduce key spreading distance of a pinboard in 2 times to D=F/2, preserving its hexagonal structure, as it demonstrated at FIG. 15c. This pinboard with pin keys 156 has the same value of safe displacement equal to 0, as the staggered keyboard with full size buttons 154 at FIG. 15a, but occupy in 4 times smaller space or is in 2 time narrower then staggered keyboard 15a. Comparing to the traditional non-staggered desktop keyboards with horizontal rows having the same key spreading distance and zero safe displacement, the width of staggered pinboard may be about 4 times smaller.

In the general case, the value of safety displacement is equal to D−S/2−F/2. Therefore, for a given, fixed sizes of a finger F and a button S, the problem of maximization of safe displacement is equivalent to the problem of maximization of key spreading distance D, and the optimal staggered button keyboard of the method is a keyboard having a maximum safety displacement. This is a beneficial property of keyboards of the disclosure providing their guaranteed optimal usability.

Figure 16:
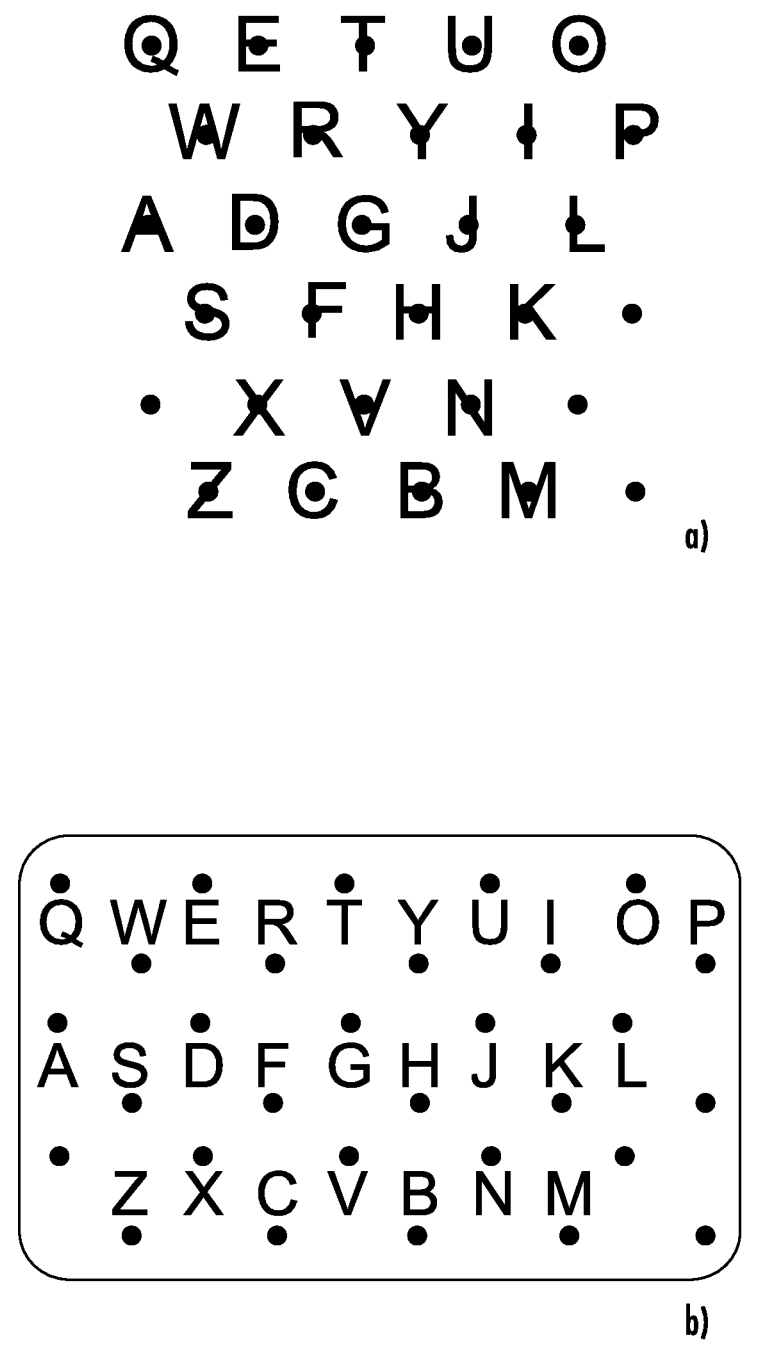

For example, the staggered hexagonal pinboard, demonstrated at FIG. 16a has pin buttons with diameter about 1 mm and a key spreading distance of about 13 mm. It provides the same safety displacement distance about 3 mm, as the standard desktop keyboard, but has the width equal to about 6 cm, comparing to 19 cm width for 10 keys of the standard desktop keyboard. This pinboard has a width equal to about size of 3 buttons of a standard desktop keyboard. An embodiment of a staggered QWERTY pinboard fitting to sizes of a standard credit card (85.6 mm×54 mm) demonstrated at FIG. 16b, has 12.4 mm key spreading distance. So, safety displacement distance of this credit card keyboard is almost the same as for a desktop keyboard. So, a credit card size pinboard of the disclosure may be as comfortable, as a desktop keyboard.

Alternatively, the method also may construct staggered keyboards of minimal area for given fixed button size S and safety displacement. A maximum safety distance of keyboards of the disclosure allows less accurate targeting, reduce error rate and improves their usability. Compact, but ergonomic keyboards of the current disclosure may be beneficial for many handheld devices, like remote controls, phones, credit cards, keypads, security devices and other. Narrow keyboards provide comfortable one-hand input and control.

All benefits of hardware staggered pinboards may be implemented in software and touch screen keyboards, if touch detection system provides detection of shape and parameters of touch area.

Additional Embodiments

Figure 17:
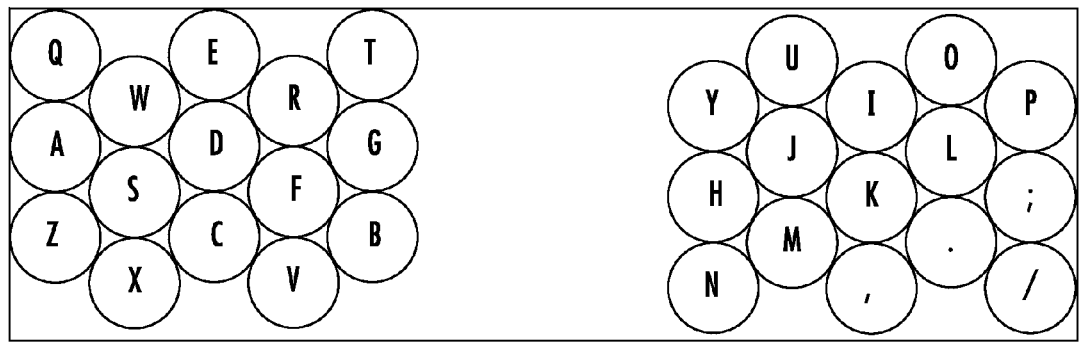
FIG. 17 is a schematic diagram of the arrangement of lattice keyboard with the layout split into two rectangles, according to the present invention.
Figure 22:
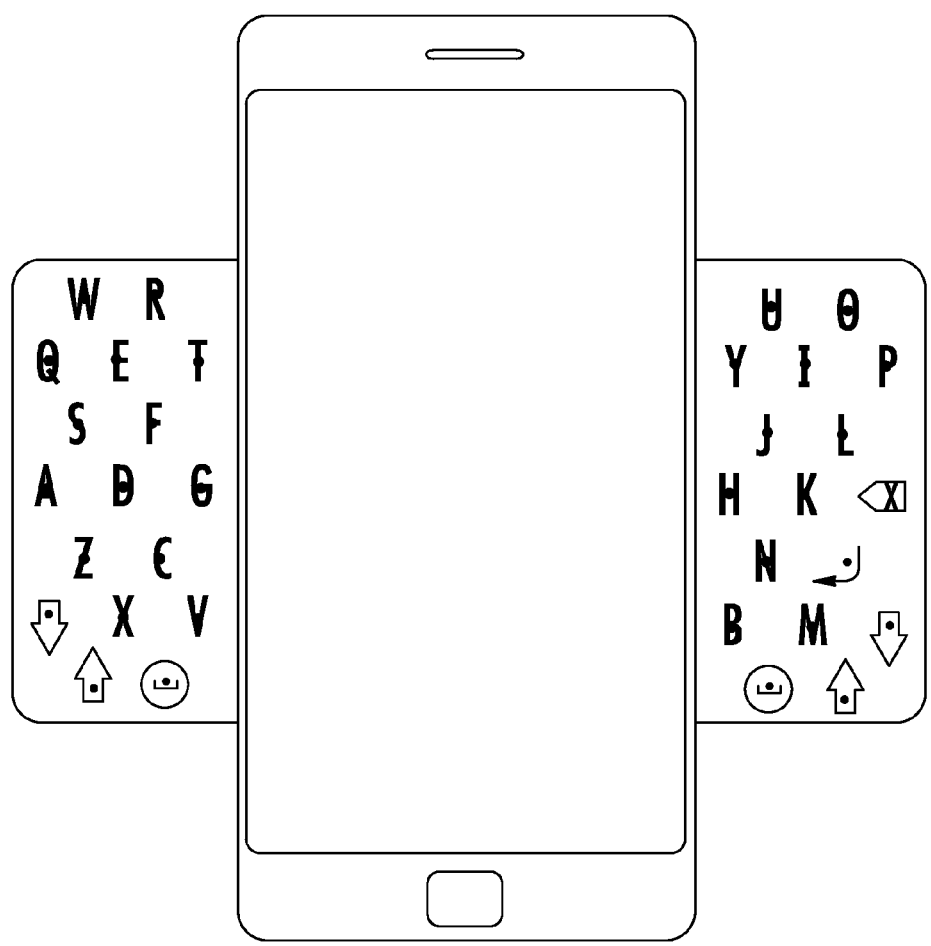
FIG. 22 is a schematic diagram illustrating an embodiment of a hardware QWERTY keyboard having a split layout, according to the present invention.

Another embodiment of the shape of the container for a keyboard of the invention is a split keyboard, which comprises two rectangles for two halves of QWERTY keyboard. The disclosed method may be directly applied in this case to these halves. The embodiment of the virtual split keyboard of the invention is demonstrated at FIG. 17. Each half contains 15 keys. This embodiment may be beneficial for ergonomic two hands input using hardware keyboards or for virtual landscape thumb keyboards. The embodiment of the hardware split pinboard is demonstrated at FIG. 22. This keyboard may be implemented as a sliding, a rotating or a magnetic attachment to a phone or comprise a part of the body of a phone.

Figure 18:
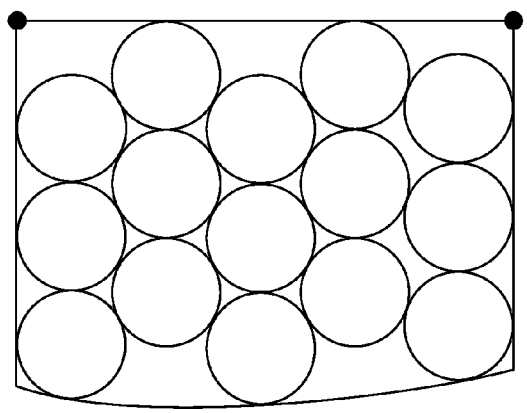
FIG. 18 is a schematic diagram of the arrangement of lattice keyboard having non-rectangle container, according to the present invention.

The embodiment of a container for the disclosed method is a rectangle, but as it was mentioned above, the method may be applied to containers having an arbitrary shape including, but not limited to polygons of any shape, circles, sectors, curvilinear shapes. Lattice keyboards of the current disclosure also may have non-periodic key lattices. For example, FIG. 18 demonstrates an arrangement of QWERTY keyboard with non-periodic key lattice within a container having one circular side.

To find an optimal lattice keyboard, the method may look for the optimal lattice packing of circles of within a given container. This problem is not resolved in the general case, but there exist a number of different numeric methods of iterative optimization of packaging, like simulated annealing, which may be used for searching of near optimal and in some cases optimal lattice packing of circles of variable size within a container of given shape.

The beneficial property of lattice keyboards of the disclosure is that the shape of the border of the lattice of known structure defines the whole lattice keyboard. Indeed, at each iterative step the method of the invention may reconstruct one new internal node of a lattice based on 3 adjacent corner nodes at the border, and remove one border node until all internal nodes are reconstructed. This property radically reduces the dimension of the space of possible solutions for the circular lattice packing problem of the current disclosure in these cases.

Figure 19:
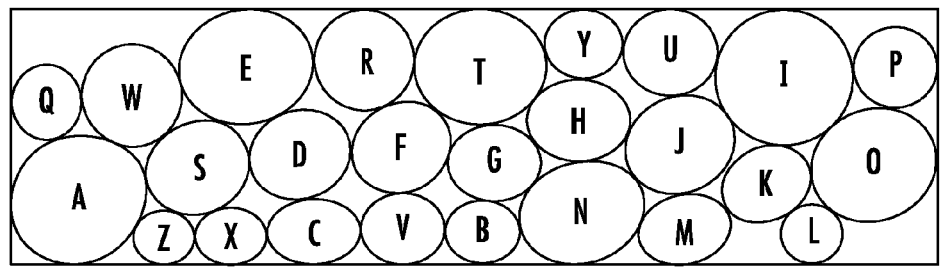
FIG. 19 is a schematic diagram of the arrangement of QWERTY lattice keyboard with keys of variable sizes corresponding frequencies of letter usage, according to the present invention.

The method may also be applied for keyboards with keys of variable sizes. In one embodiment, sizes of keys may be proportional to the frequency of their usage. For example, FIG. 19 demonstrates an arrangement of QWERTY lattice keyboard with keys of different sizes, which are determined by letter frequencies. This keyboard preserves 4-connectivity of the original square lattice, and therefore order of letters in and between rows of the QWERTY keyboard.

In some embodiments, the method of the invention may also construct scaled lattice keyboards. This may be beneficial in cases when a touch tip area is elongated in some direction. For example, if a tip area is elongated horizontally, the method may construct a lattice keyboard for a vertical dimension of a tip area, and then scale it up horizontally to fit a horizontal dimension.

In one embodiment of the staggered keyboard, buttons in rows of the original keyboard may be mapped to buttons of the staggered keyboard preserving connectivity between adjacent buttons only in rows. For example, a staggered keyboard with connected rows, comprising 10 buttons in connected rows of QWERTY layout, demonstrated at FIG. 4 has a reduced width of 4.46 units.

Prediction and Correction

Lattice keyboards of the invention provide a significant reduction of errors, so problems of input prediction and correction are less important for them. However, many of the existing methods for input prediction and correction for classic matrix keyboards might be used together with disclosed lattice keyboards to speed up the typing process and to fix possible errors.

Due a transformable nature of the lattice keyboard, the method can't use some of prediction approaches based on relative positions of keys and shapes of key sequences, because they may be changed during transformations. Improved input prediction methods for clickable touch interfaces is disclosed in co-pending Provisional Patent Application Ser. No. 61/882,408, filed Sep. 25, 2013, titled "System and method for improved target recognition for touch interfaces," the contents of which are hereby incorporated by reference in their entirety.

Lattice keyboards of the invention also may be used for continuous swipe input. The user may draw a trace over the lattice keyboard passing through or near nodes displaying letters of a desired word. The system may generate a list of possible candidate words ordered accordingly their calculated weights and provide it to a user for word selection.

Figure 20:
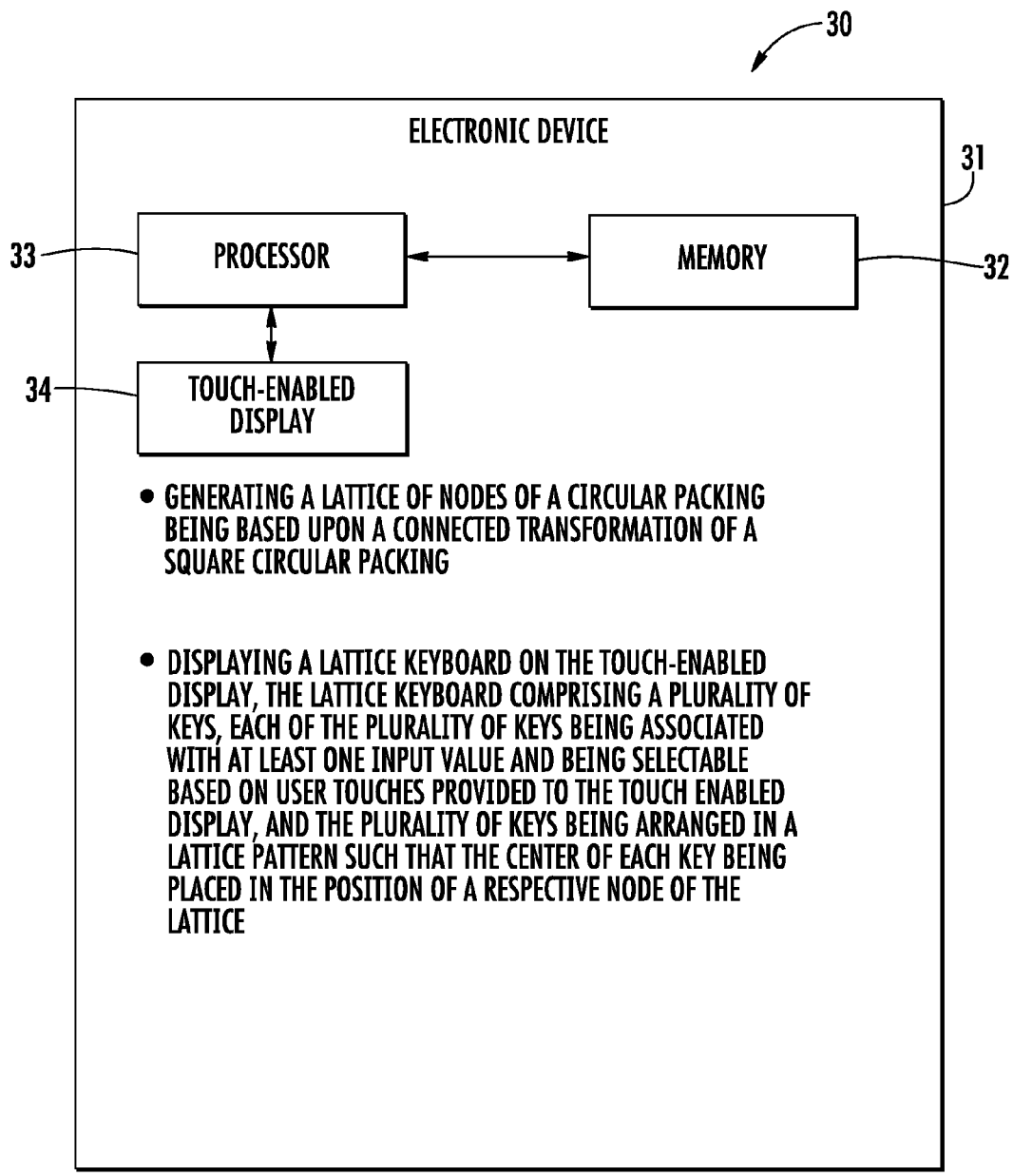
FIG. 20 is a schematic diagram of an electronic device, according to the present invention.

Referring now to FIG. 20, an electronic device 30 according to the present invention is now described. The electronic device 30 illustratively includes a housing 31, a processor 33 carried by the housing, a memory 32 coupled to the processor and also carried by the housing, and a touch-enabled display 34 coupled to the processor and also carried by the housing. The processor 33 is for generating a lattice of nodes of a circular packing being based upon a connected transformation of a square circular packing. The connected transformation preserves adjacency between pairs of adjacent circles of the square circular packing after a transformation. The processor 33 is also for displaying a lattice keyboard on the touch-enabled display 34, the lattice keyboard comprising a plurality of keys. Each of the keys is associated with at least one input value and is selectable based on user touches provided to the touch enabled display 34. The plurality of keys may be arranged in a lattice pattern such that the center of each key is placed in the position of a respective node of the lattice.

In particular, the circular packing of the lattice keyboard may comprise a circular packing of circles of a same diameter within a container. The shape of the container may be a rectangle.

In some embodiments, a length on a first side of the rectangle of the container is a given constant value, a distance between centers of adjacent circles of the circular packing of the lattice keyboard is a given constant value, and a length of a second side of the rectangle of the container is variable and has a minimal possible value. In other embodiments, a length on a first side of the rectangle of the container is a given constant value, a length on a second side of the rectangle of the container is a given constant value, and a distance between centers of adjacent circles of the circular packing of the lattice keyboard is variable and has a maximal possible value.

The rectangle of the container of lattice keyboard may have an adjustable size and an adjustable position on the touch-sensitive display 34. Positions and displacements of first and second input pointers on the touch-sensitive display 34 may be used for determination of the adjustable position and the adjustable size of the rectangle of the lattice keyboard on the touch-sensitive display.

Also, the circular packing of the lattice keyboard may be a staggered periodic packing. The keys in rows of the lattice keyboard may preserve an order of input values of keys in and between rows of a square lattice keyboard. The lattice keyboard may preserve an order of keys in and between rows of a QWERTY keyboard.

In some embodiments, the plurality of keys of the lattice keyboard may have identical shapes within bounding circles. The shapes of the plurality of keys of the lattice keyboard may not be displayed.

Another aspect is directed to a keyboard. The keyboard may comprise a plurality of keys, each of the keys being associated with at least one input value. The plurality of keys may be arranged in a lattice pattern such that a center of each key is placed in a position of a respective node of the lattice. The lattice of nodes of a circular packing may be based upon a connected transformation of a square circular packing, the connected transformation preserving adjacency between pairs of adjacent circles of the square circular packing after a transformation. In some embodiments, the keyboard further comprises solid dot knobs in centers of keys of a lattice keyboard over flat touch sensitive surface.

Another aspect is directed to a lattice input interface. The lattice input interface may comprise a plurality of keys, each of the keys being associated with at least one input value. The plurality of keys may be arranged in a lattice pattern such that a center of each key is placed in a position of a respective node of the lattice. The lattice of nodes of a circular packing may be based upon a connected transformation of a square circular packing, the connected transformation preserving adjacency between pairs of adjacent circles of the square circular packing after a transformation.

In some embodiments, the lattice of keys is manifested electronically upon a touch enabled screen. In other embodiments, the lattice of keys may be disposed upon a plurality of buttons.

One of ordinary skill in the art will recognize that the present embodiments may be incorporated into hardware and software systems and devices for input. These devices or systems generally may include a computer system including one or more processors that are capable of operating under software control to provide the input method of the present disclosure.

Computer program instructions may be loaded onto a computer or other programmable apparatus to produce a machine, such that the instructions, which execute on the computer or other programmable apparatus together with associated hardware create means for implementing the functions of the present disclosure. These computer program instructions may also be stored in a computer-readable memory that can direct a computer or other programmable apparatus to function in a particular manner, such that the instructions stored in the computer-readable memory together with associated hardware produce an article of manufacture including instruction means which implement the functions of the present disclosure. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions of the present disclosure. It will also be understood that functions of the present disclosure can be implemented by special purpose hardware-based computer systems, which perform the specified functions or steps, or combinations of special purpose hardware and computer instructions.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An electronic device comprising:
a processor;
a memory coupled to said processor; and
a touch-enabled display coupled to said processor;
said processor for
generating a connected transformation from an original circular packing with a square lattice of nodes to a transformed circular packing with a transformed non-square lattice of nodes within a container of given shape and size,
the connected transformation preserving adjacency in the transformed circular packing and between pairs of adjacent circles of the original circular packing,
the connected transformation changing sizes of all circles of the transformed circular packing depending on a change of the given size of the container so that all adjacent circles have equal diameters and equal spacing between respective centers, and
displaying a lattice keyboard on said touch-enabled display, the lattice keyboard comprising a plurality of keys, each of the plurality of keys being associated with at least one input value and being selectable based on user touches provided to said touch-enabled display,
the plurality of keys being arranged in a lattice pattern such that a center of each key is placed at a respective node of the transformed non-square lattice of nodes.

2. The electronic device of claim 1 wherein the transformed circular packing of the lattice keyboard comprises a circular packing of circles of a same diameter within a the container.

3. The electronic device of claim 2 wherein a shape of the container is a rectangle.

4. The electronic device of claim 3 wherein a length on a first side of the rectangle of the container is a given. constant value; wherein a distance between centers of adjacent circles of the transformed circular packing of the lattice keyboard is a given constant value; and wherein a length of a second side of the rectangle of the container is variable and has a minimal possible value.

5. The electronic device of claim 3 wherein a length on a first side of the rectangle of the container is a given constant value; wherein a length on a second side of the rectangle of the container is a given constant value; and wherein a distance between centers of adjacent circles of the transformed circular packing of the lattice keyboard is variable and has a maximal possible value.

6. The electronic device of claim 3 wherein the rectangle of the container of lattice keyboard has an adjustable size and an adjustable position on said touch-enabled display.

7. The electronic device of claim 6 wherein positions and displacements of first and second input pointers on said touch-enabled display are used for determination of the adjustable position and the adjustable size of the rectangle of the lattice keyboard on said touch-enabled display.

8. The electronic device of claim 2 wherein the transformed circular packing of the lattice keyboard is a staggered periodic packing.

9. The electronic device of claim 8 wherein keys in rows of the lattice keyboard preserve an order of input values of keys in and between rows of a square lattice keyboard.

10. The electronic device of claim 9 wherein the lattice keyboard preserves an order of keys in and between rows of a QWERTY keyboard.

11. The electronic device of claim 1 wherein the plurality of keys of the lattice keyboard have identical shapes within bounding circles.

12. The electronic device of claim 1 wherein shapes of the plurality of keys of the lattice keyboard are not displayed.

13. A keyboard comprising:
   a plurality of keys, each of the plurality of keys being associated with at least one input value;
   said plurality of keys being arranged in a lattice pattern such that a center of each key is placed in a position of a respective node of the lattice,
   said lattice pattern being based upon a connected transformation from an original circular packing with a square lattice of nodes to a transformed circular packing with the transformed non-square lattice of nodes within a container of given shape and size;
   the connected transformation preserving adjacency in the transformed circular packing and between pairs of adjacent circles of the original circular packing;
   the connected transformation changing sizes of all circles of the transformed circular packing depending on a change of the given size of the container so that all adjacent circles have equal diameters and equal spacing between respective centers.

14. The keyboard of claim 13 wherein the transformed circular packing of the lattice keyboard comprises a circular packing of circles of a same diameter within the container.

15. The keyboard of claim 14 wherein a shape of the container is a rectangle.

16. The keyboard of claim 15 wherein a length on a first side of the rectangle of the container is a given constant value; wherein a distance between centers of adjacent circles of the transformed circular packing of the lattice pattern is a given constant value; and wherein a length of a second side of the rectangle of the container is variable and has a minimal possible value.

17. The keyboard of claim 15 wherein a length on a first side of the rectangle of the container is a given constant value; wherein a length on a second side of the rectangle of the container is a given constant value; and wherein a distance between centers of adjacent circles of the transformed circular packing of the lattice keyboard is variable and has a maximal possible value.

18. The keyboard of claim 14 wherein the transformed circular packing of the lattice keyboard is a staggered periodic packing.

19. The keyboard of claim 18 wherein keys in rows of the lattice keyboard preserve an order of input values of keys in and between rows of a square lattice keyboard.

20. The keyboard of claim 19 wherein the lattice keyboard preserves an order of keys in and between rows of a QWERTY keyboard.

21. The keyboard of claim 13 further comprising a plurality of solid dot knobs in centers of keys of a lattice keyboard over flat touch sensitive surface.

22. A lattice input interface comprising:
   a plurality of keys, each of the plurality of keys being associated with at least one input value;
   said plurality of keys being arranged in a lattice pattern such that a center of each key is placed in a position of a respective node of the lattice,
   said lattice pattern being based upon a connected transformation from an original circular packing with a square lattice of nodes to a transformed circular packing with the transformed non-square lattice of nodes within a container of given shape and size;
   the connected transformation preserving adjacency in the transformed circular packing and between pairs of adjacent circles of the original circular packing;
   the connected transformation changing sizes of all circles of the transformed circular packing depending on a change of the given size of the container so that all adjacent circles have equal diameters and equal spacing between respective centers.

23. The lattice input interface of claim 22 wherein the transformed circular packing of the key lattice comprises a circular packing of circles of a same diameter within the container.

24. The lattice input interface of claim 23 wherein the shape of the container is a rectangle.

25. The lattice input interface of claim 23 wherein the transformed circular packing of the key lattice is a staggered periodic packing.

26. The lattice input interface of claim 22 wherein said key lattice is manifested electronically upon a touch enabled screen.

27. The lattice input interface of claim 22 wherein said key lattice is disposed upon a plurality of buttons.

* * * * *